United States Patent
Ramos

(10) Patent No.: US 12,277,364 B2
(45) Date of Patent: Apr. 15, 2025

(54) SYNCHRONIZATION VIA OUT-OF-BAND CLOCK TIMING SIGNALING

(71) Applicant: Sonos, Inc., Santa Barbara, CA (US)

(72) Inventor: Aurelio Ramos, Boston, MA (US)

(73) Assignee: Sonos, Inc., Goleta, CA (US)

(*) Notice: Subject to any disclaimer, the term of this patent is extended or adjusted under 35 U.S.C. 154(b) by 290 days.

(21) Appl. No.: 17/585,078

(22) Filed: Jan. 26, 2022

(65) Prior Publication Data

US 2022/0244907 A1    Aug. 4, 2022

Related U.S. Application Data

(60) Provisional application No. 63/143,909, filed on Jan. 31, 2021.

(51) Int. Cl.
| | |
|---|---|
| G06F 3/16 | (2006.01) |
| G11B 20/10 | (2006.01) |
| H04L 67/1095 | (2022.01) |
| H04N 21/43 | (2011.01) |

(52) U.S. Cl.
CPC ............ *G06F 3/165* (2013.01); *G06F 3/162* (2013.01); *G11B 20/10527* (2013.01); *H04L 67/1095* (2013.01); *H04N 21/4307* (2013.01)

(58) Field of Classification Search
None
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | Dilorenzo |

(Continued)

FOREIGN PATENT DOCUMENTS

| | | |
|---|---|---|
| EP | 1389853 A1 | 2/2004 |
| EP | 2709298 | 7/2018 |

(Continued)

OTHER PUBLICATIONS

Audio Tron Quick Start Guide, Version 1.0, Mar. 2001, 24 pages.

(Continued)

*Primary Examiner* — Hemant S Patel

(74) *Attorney, Agent, or Firm* — Akerman LLP

(57) ABSTRACT

Disclosed embodiments include facilitating clock synchronization and/or synchronous playback among multiple playback devices in a group. An individual playback device estimates and/or calculates a clock time at a clock time source (or a time offset/error between the playback device and the clock time source) based on (i) first clock timing received from the clock time source via a primary timing link and (i) second clock timing received from the clock time source via a secondary timing link. In some embodiments, estimating and/or calculating a clock time and/or clock time offset/error comprises estimating and/or calculating the clock time and/or clock time offset/error with a state estimator, such as a Kalman filter, an extended Kalman filter, or other state estimator configured to estimate a clock time and/or clock time error based on clock timing received via two or more communications links.

20 Claims, 17 Drawing Sheets

(56) References Cited

U.S. PATENT DOCUMENTS

| | | |
|---|---|---|
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 * | 7/2012 | Millington ............ H04L 65/612 709/248 |
| 8,483,853 B1 | 7/2013 | Lambourne |
| 8,942,252 B2 | 1/2015 | Balassanian et al. |
| 9,100,687 B2 * | 8/2015 | Amidei .............. H04N 21/8547 |
| 9,313,591 B2 | 4/2016 | Sheen |
| 10,157,035 B2 | 12/2018 | Millington |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2017/0289500 A1 * | 10/2017 | Biderman ................ H04N 7/15 |
| 2020/0050423 A1 | 2/2020 | Coburn, IV et al. |
| 2020/0117416 A1 * | 4/2020 | Vega Zayas ....... H04N 21/4302 |
| 2021/0029453 A1 | 1/2021 | Banerjee et al. |

FOREIGN PATENT DOCUMENTS

| | | |
|---|---|---|
| WO | 200153994 | 7/2001 |
| WO | 2003093950 A2 | 11/2003 |

OTHER PUBLICATIONS

Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Preliminary Report on Patentability, PCT/US2022/014320, Jul. 31, 2023.
Examination Report, EP2270524.7, Dec. 19, 2023.

* cited by examiner

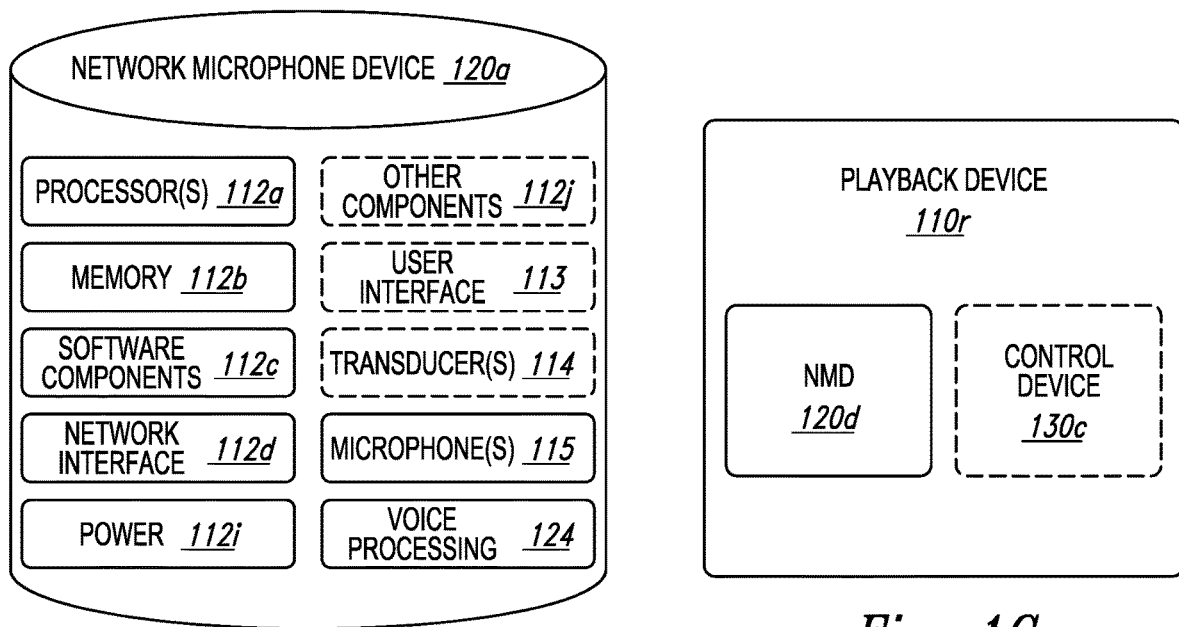
*Fig. 1F*
*Fig. 1G*
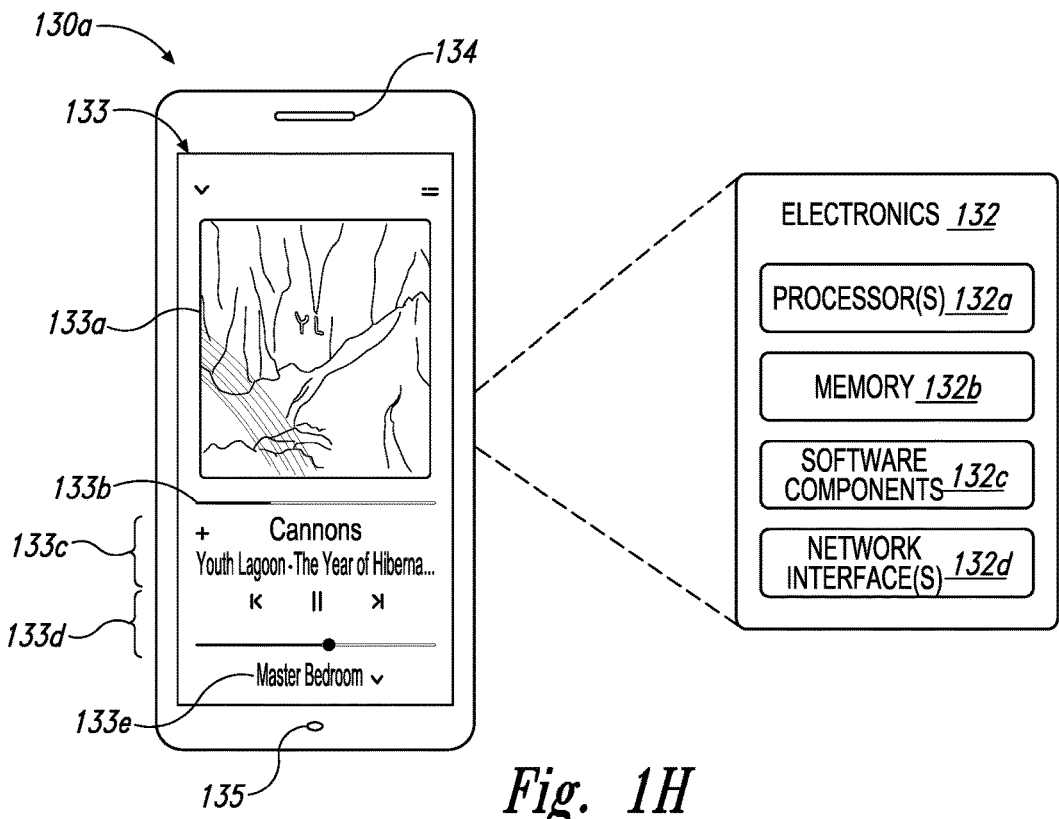
*Fig. 1H*

SYNCHRONIZATION VIA OUT-OF-BAND CLOCK TIMING SIGNALING

CROSS-REFERENCE TO RELATED APPLICATIONS

The present application claims priority to U.S. Prov. App. 63/143,909 titled "Synchronization via Out-of-Band Clock Timing Signaling," filed on Jan. 31, 2021. The entire contents of App. 63/143,909 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F shows a block diagram of a network microphone device.

FIG. 1G shows a block diagram of a playback device.

FIG. 1H shows a partially schematic diagram of a control device.

Figure 1A:
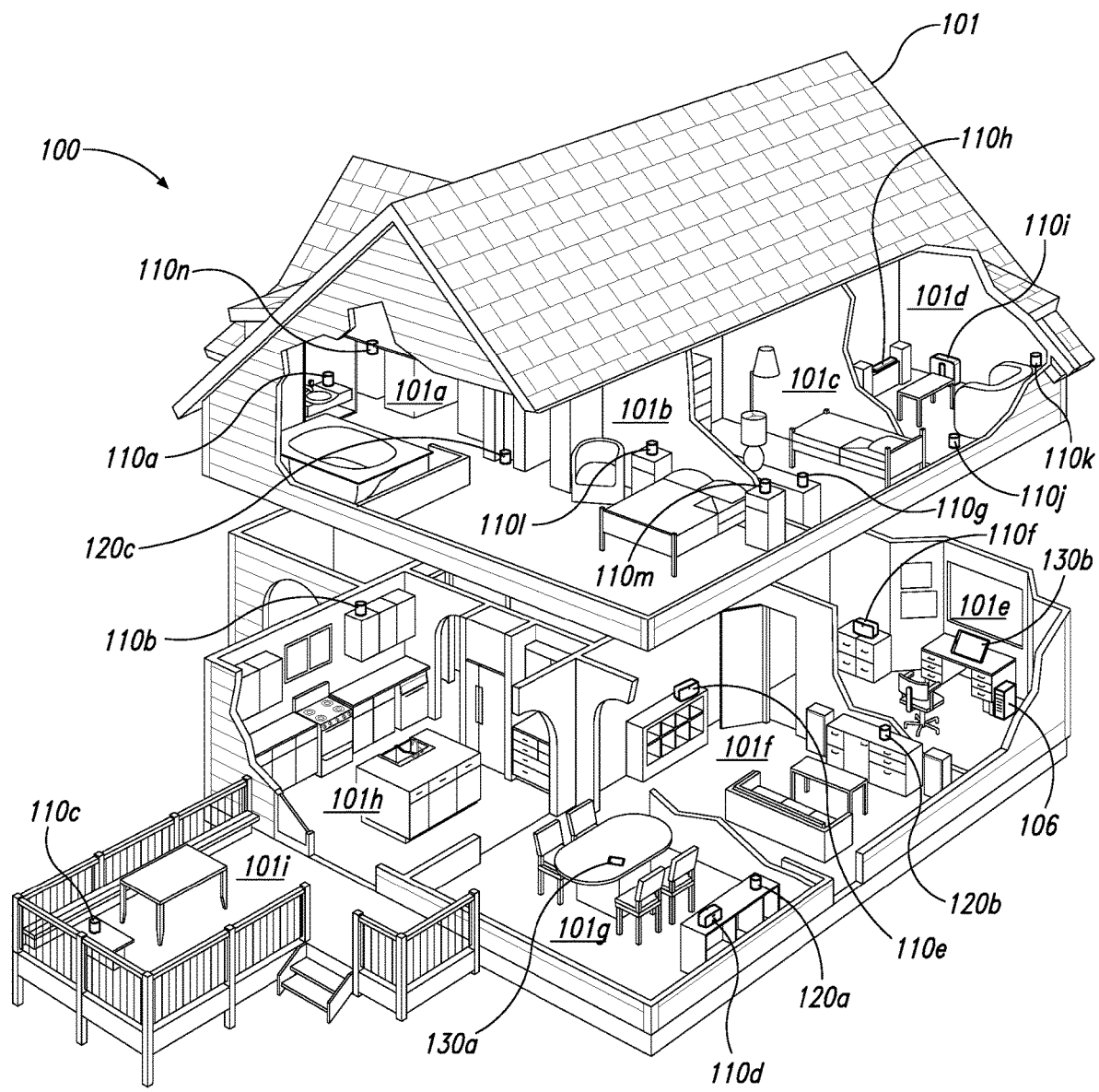
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

It can be desirable to configure multiple networked media playback devices (sometimes referred to herein as playback devices, media players, or zone players) into a playback group of media playback devices configured to play audio content in synchrony with each other. A group of playback devices configured to play audio content in synchrony with each other is sometimes referred to herein as a playback group, a synchrony group, a zone group, a bonded group, a bonded zone, and/or a stereo pair.

Some of the technical challenges that arise when configuring multiple playback devices to play audio content in synchrony with each other in a groupwise manner include synchronizing the playback of the audio content among the playback devices in the group. To synchronize the playback of audio content among multiple playback devices in a group, some embodiments include the individual playback devices in the group using a common clock time reference on which to base their individual playback of audio content so that, as a group, the individual playback devices play the audio content in synchrony with each other in a groupwise manner.

In some embodiments, one or more (or all) the playback devices in a group use one or more network time protocols (e.g., Network Time Protocol (NTP), Simple Network Time Protocol (SNTP), Precision Time Protocol (PTP), etc.) to share clock timing that one or more (or all) of the playback devices use for playing audio content in synchrony with each other. In some embodiments, each playback device in the group includes a local clock that the playback device uses to play audio content based at least in part on the clock timing. In operation, one or more of the playback devices in the group use one or more network time protocols (e.g., NTP, SNTP, or PTP; variants of NTP, SNTP or PTP; or other suitable network time protocols) to transmit, receive, and/or otherwise share clock timing within the group. Individual playback devices in the group use the clock timing to synchronize their local clocks and/or synchronize playback of audio content with other playback devices in the group.

However, the accuracy of the clock timing shared via the network time protocols, and thus the usability of such clock timing for clock synchronization and/or synchronous playback, depends at least in part on the quality of the network connection(s) via which the playback devices transmit, receive, and/or otherwise share the clock timing via the network time protocols. As more devices become Internet-enabled, Wireless Local Area Networks (WLANs) need to accommodate data traffic from more and more Internet of Things (IoT) and similar networked devices, which can cause WLANs to become increasingly congested, especially in the 2.4 GHz band, but also in the 5 GHz band that has historically been less congested. This increase in network traffic can introduce packet losses, latency, and/or jitter, resulting in degraded network conditions. As packet loss, latency, and/or jitter increases, it can become more difficult for the playback devices to transmit, receive, and/or otherwise share clock timing in a sufficiently reliable and/or timely manner suitable for use in synchronizing clocks and/or synchronizing playback of audio content.

The systems and methods disclosed and described herein overcome the above-mentioned and other technical problems that can arise when attempting to synchronize local clocks and/or synchronize playback of audio content by multiple playback devices in a playback group, particularly in the presence of network congestion, latency, and other network impairments. Some embodiments include (i) transmitting clock timing to one or more playback devices via two or more communications links and/or (ii) receiving clock timing via two or more communications links and using the clock timing received via the two or more communications links to facilitate clock synchronization and/or synchronous playback.

In some embodiments, the two or more communications links comprise a first communications link and a second communications link, where communications via the first communications link are conducted via a first communication protocol and communications via the second communications link are conducted via a second communication protocol that is different than the first communication protocol. In some embodiments, the first and second communications links are wireless communications links in different wireless bands. In some embodiments, the first communications link is a WLAN link, and the second communications link is one of (i) an optical communications link, (ii) a radio frequency communications link, or (iii) an audio communications link.

In some embodiments, an individual playback device is configured to (i) transmit (or receive, depending on the playback device's role in the playback group) audio content, playback timing, and clock timing via the first communications link, and (ii) additionally transmit (or receive, depending on the role) clock timing via the second communications link. Additionally transmitting and/or receiving clock timing via the second communications link in this manner is sometimes referred to herein as out-of-band synchronization signaling because the supplemental clock timing is transmitted via a communications link that is separate from the communications link via which the audio content and playback timing (and primary clock timing) are transmitted.

In some embodiments, facilitating clock synchronization and/or synchronous playback among multiple playback devices in a group includes a playback device (i) estimating and/or calculating a clock time of a clock at a clock time source based on first clock timing received from the clock time source via the first communications link and second clock timing received from the clock time source via the second communications link and/or (ii) estimating and/or calculating a clock time error between a local clock at the playback device and a clock at a clock time source based on first clock timing received from the clock time source via the first communications link and second clock timing received from the clock time source via the second communications link.

In some embodiments, estimating and/or calculating a clock time and/or clock time error comprises estimating and/or calculating the clock time and/or clock time error with a state estimator, such as a Kalman filter, an extended Kalman filter, or other state estimator configured to estimate a clock time and/or clock time error based on clock timing received via two or more communications links.

These and other aspects of the technical solutions disclosed herein enable a playback device (or other computing device) configured in a playback group to one or both (i) synchronize a clock at the playback device (or other computing device) to a clock at a clock timing source and/or (ii) playback audio content in synchrony with one or more other playback devices (or other computing devices) in a groupwise manner.

Some embodiments disclosed herein relate to a first playback device (or other computing device) configured to transmit one or more of (i) clock timing, (ii) audio information, and/or (iii) playback timing for the audio information to one or more other playback devices in a group of playback devices configured to play audio content in synchrony with each other.

Some embodiments disclosed herein relate a first playback device (or other computing device) configured to receive one or more of (i) clock timing, (ii) audio information, and/or playback timing for the audio information from one or more other playback devices (or other computing devices). In some embodiments, one or more of the one or more other playback devices (or other computing devices) from which the first playback device receives one or more of the clock timing, audio information, and/or playback timing are grouped with the first playback device and configured to play audio content with the first playback device.

Some embodiments disclosed herein relate to a first playback device (or other computing device) comprising one or more processors and tangible, non-transitory, computer-readable media comprising instructions that, when executed, cause the first playback device (or other computing device) to perform the features and functions disclosed and described herein. And further embodiments disclosed herein relate methods of performing the features and functions disclosed and described herein.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
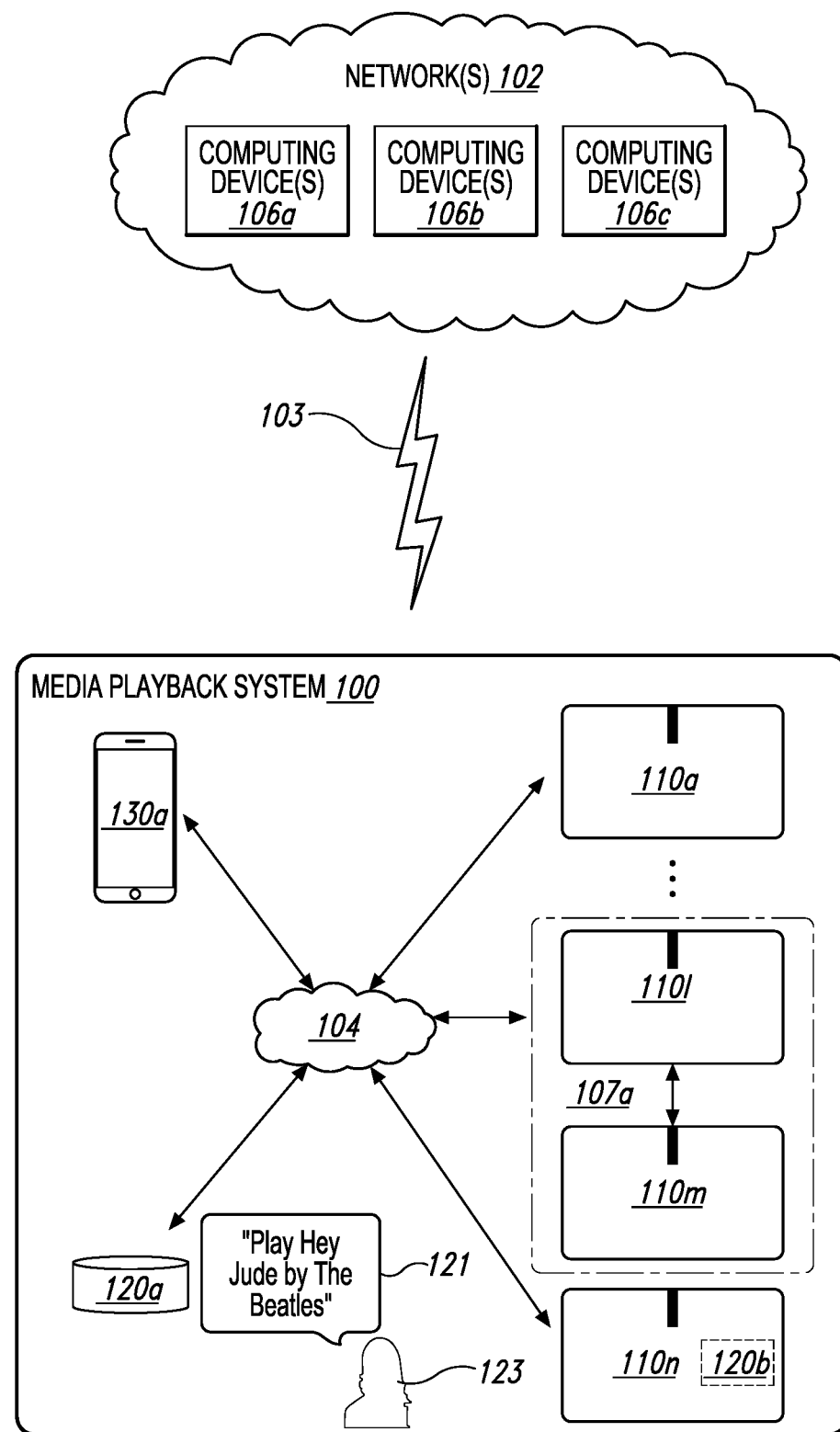
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communications links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communications links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
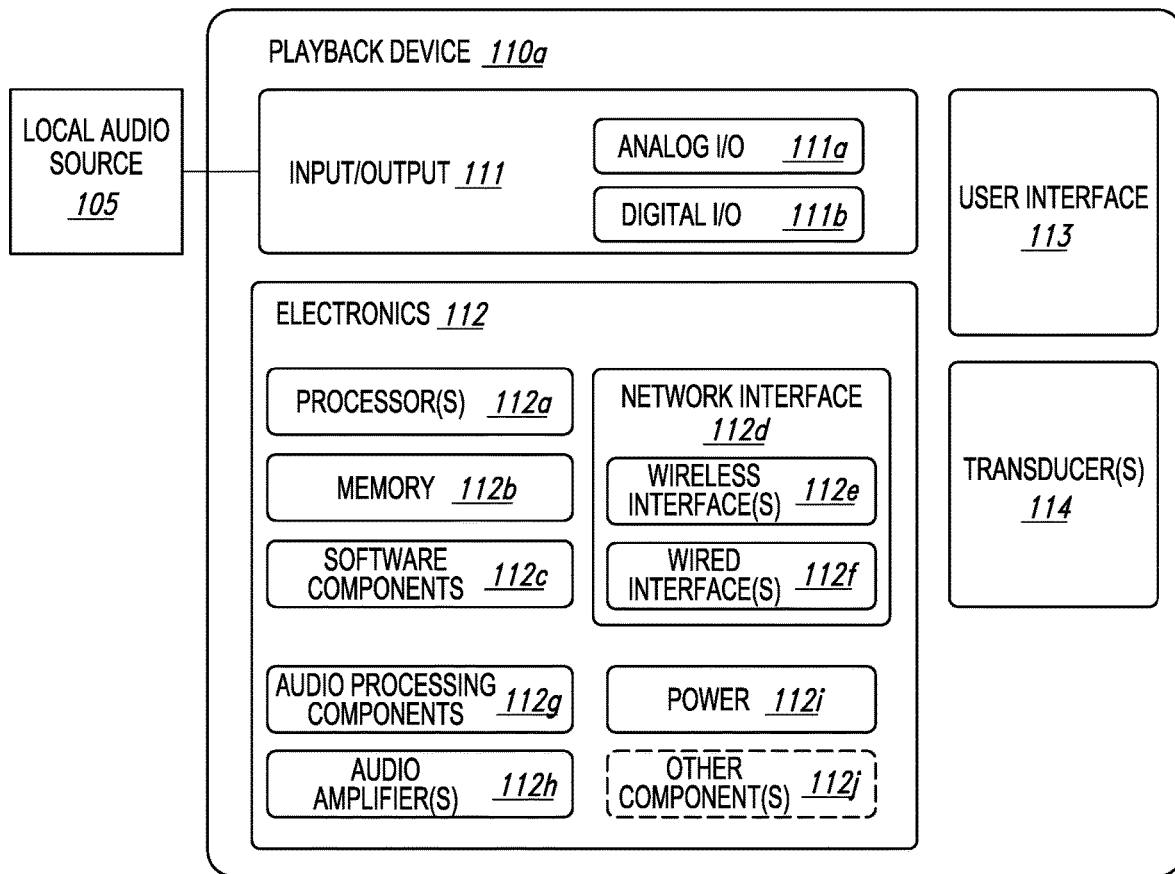
FIG. 1C shows a block diagram of a playback device.

FIG. 1C is a block diagram of the playback device 110a comprising an input/output 111. The input/output 111 can include an analog I/O 111a (e.g., one or more wires, cables, and/or other suitable communications links configured to carry analog signals) and/or a digital I/O 111b (e.g., one or more wires, cables, or other suitable communications links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communications links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communications link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1)), and/or another one of the playback devices 110. In some embodiments, the operations further include causing the playback device 110a to send audio information to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennas) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
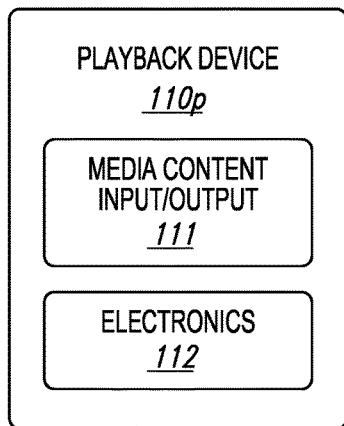
FIG. 1D shows a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
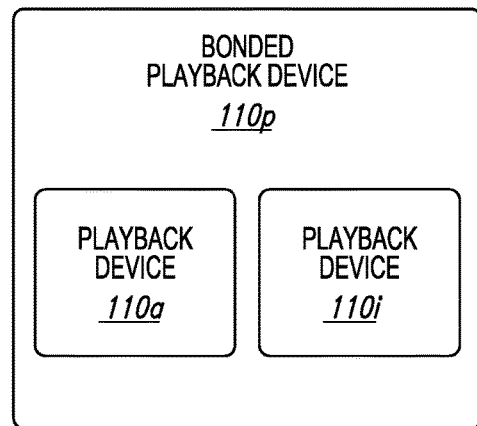
FIG. 1E shows a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1i). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1). The NMD 120a includes one or more voice processing components 124 (hereinafter "the voice components 124") and several components described with respect to the playback device 10a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1i). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figures 1I, 1J:
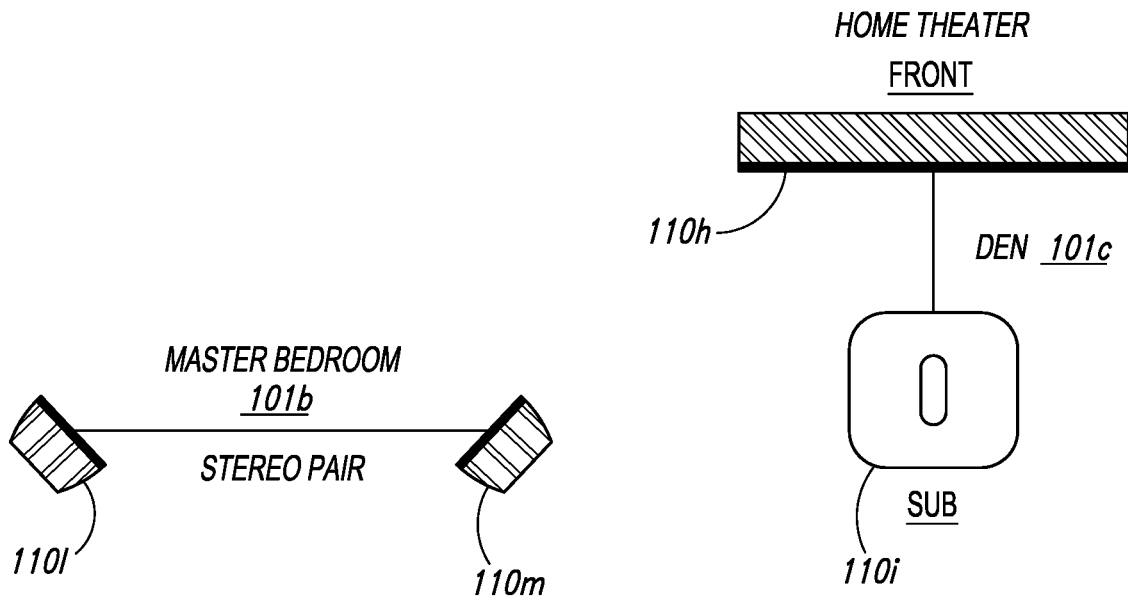
FIGS. 1I through 1L show schematic diagrams of corresponding media playback system zones.

FIG. 1H is a partially schematic diagram of the control device 130a (FIGS. 1A and 1i). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figures 1K, 1L:
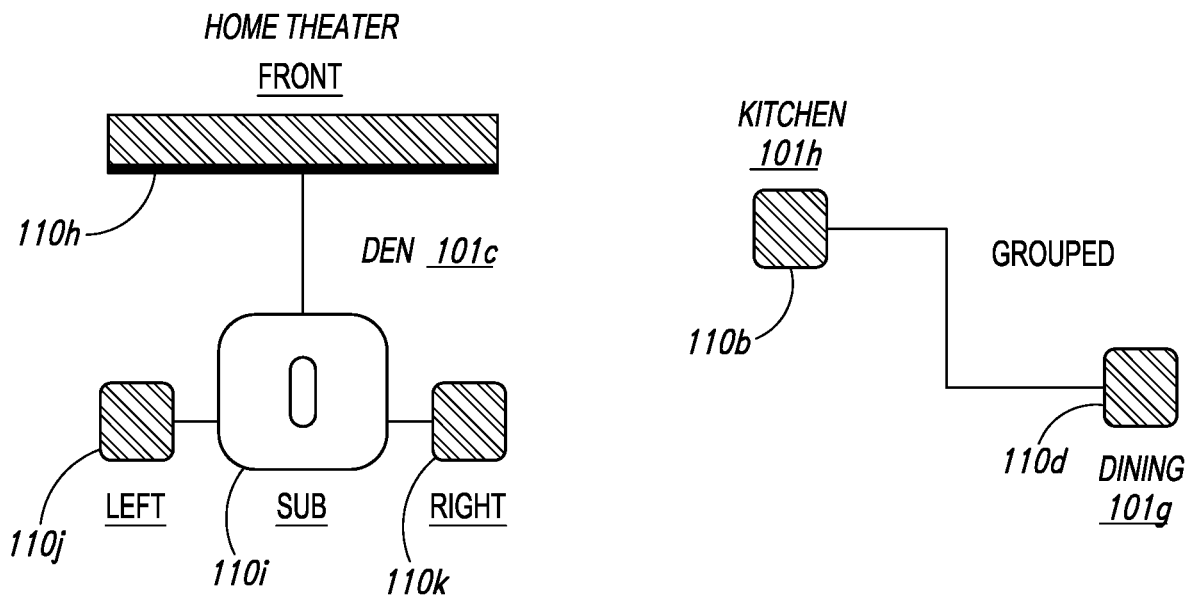
Figure 1M:
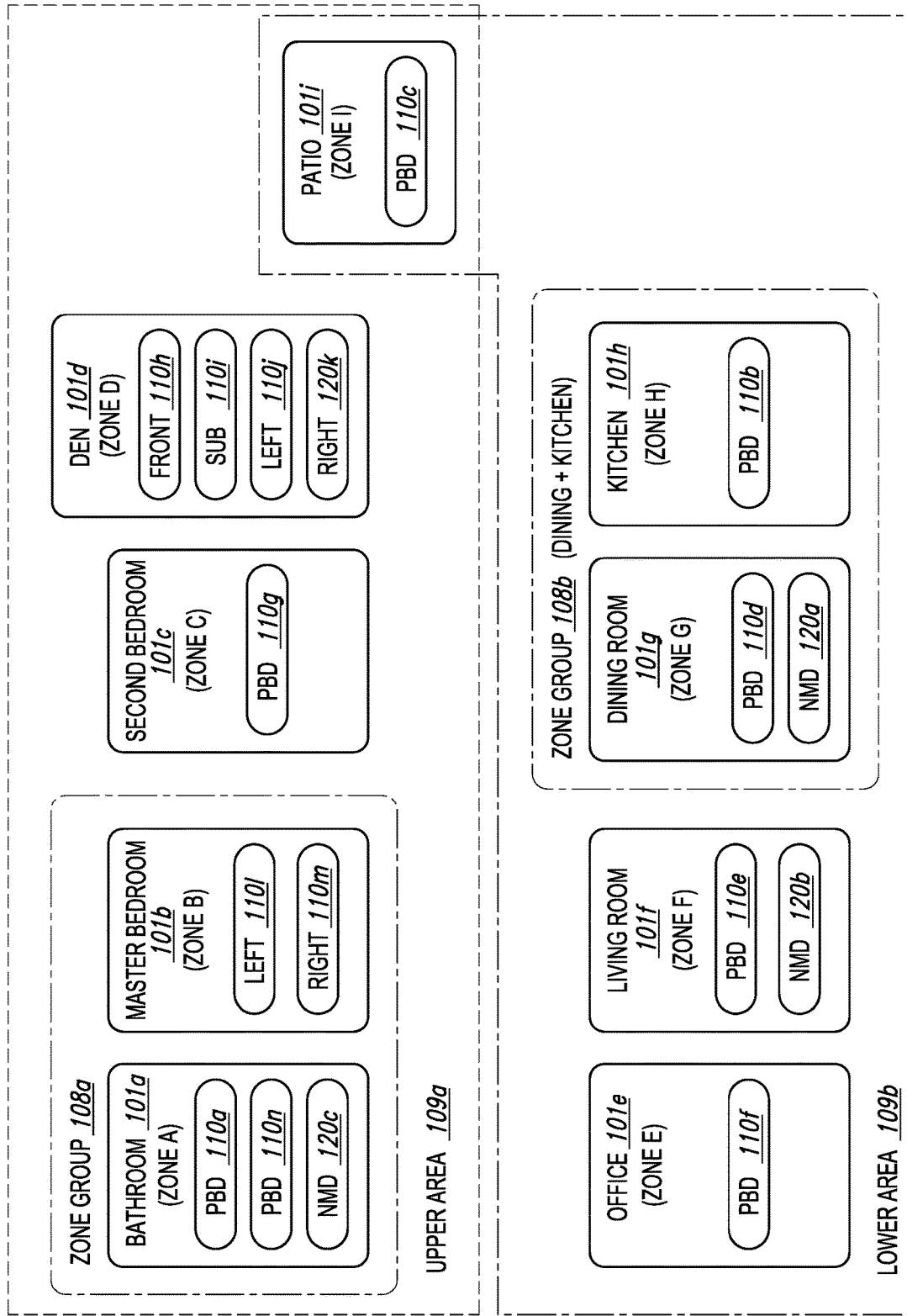
FIG. 1M shows a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

II. Example Systems and Devices

Figure 2A:
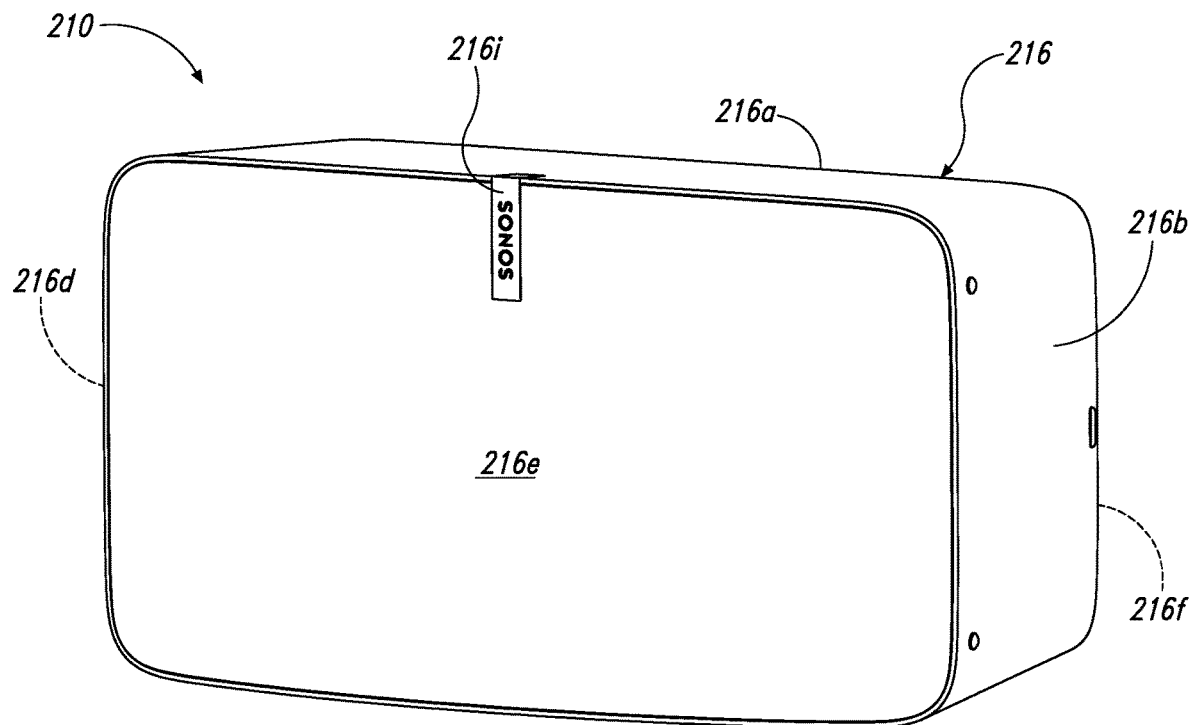
FIG. 2A shows a front isometric view of a playback device configured in accordance with aspects of the disclosed technology.
Figure 2B:
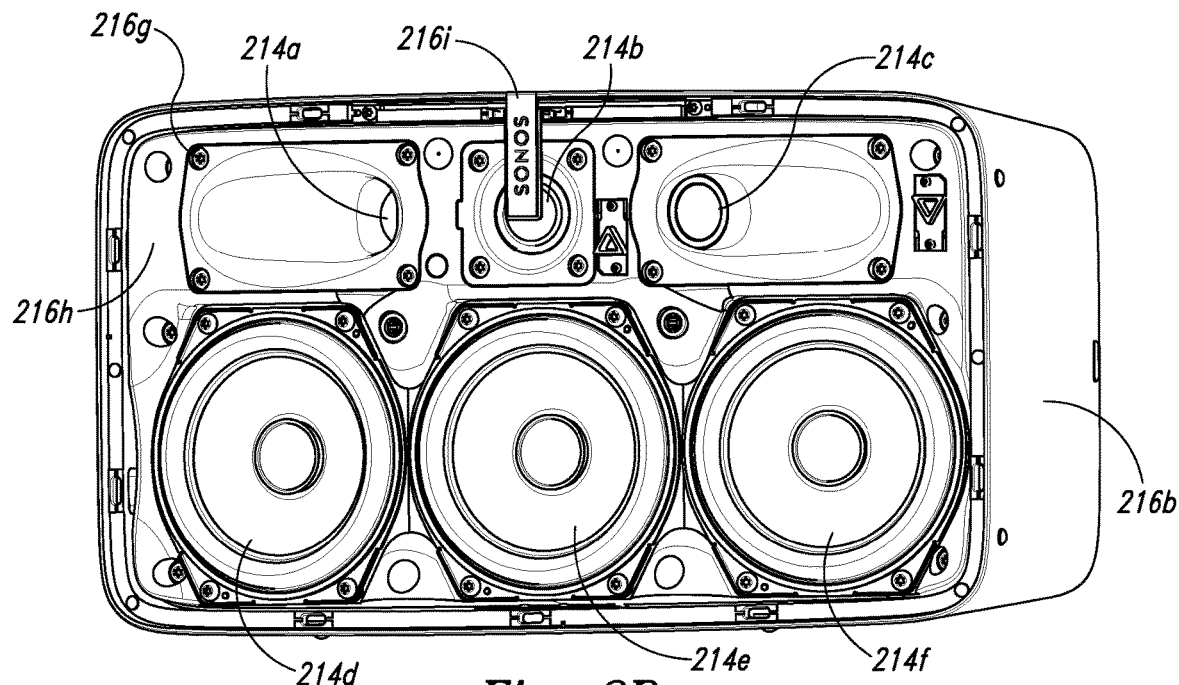
FIG. 2B shows a front isometric view of the playback device of FIG. 3A without a grille.
Figure 2C:
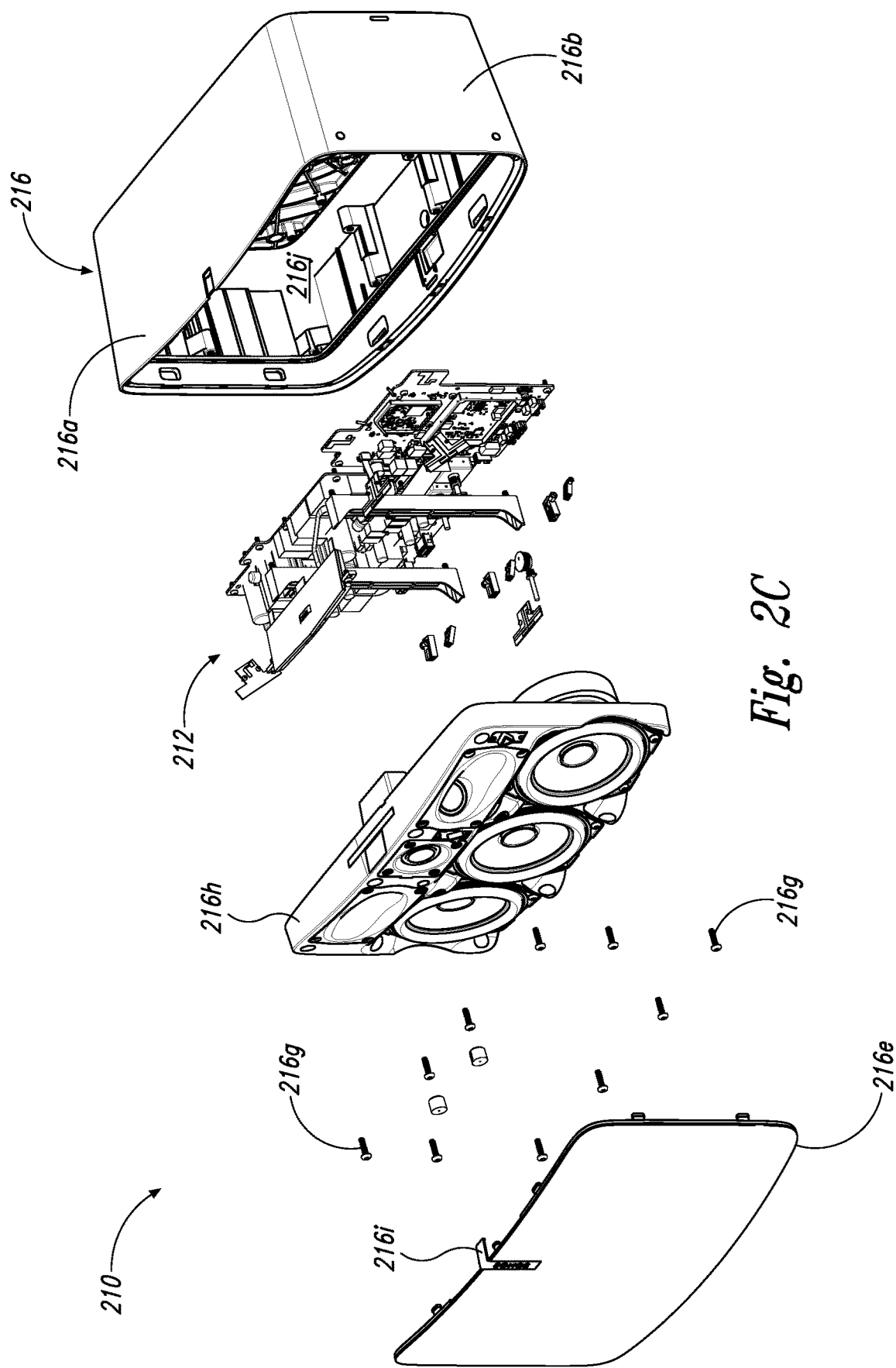
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
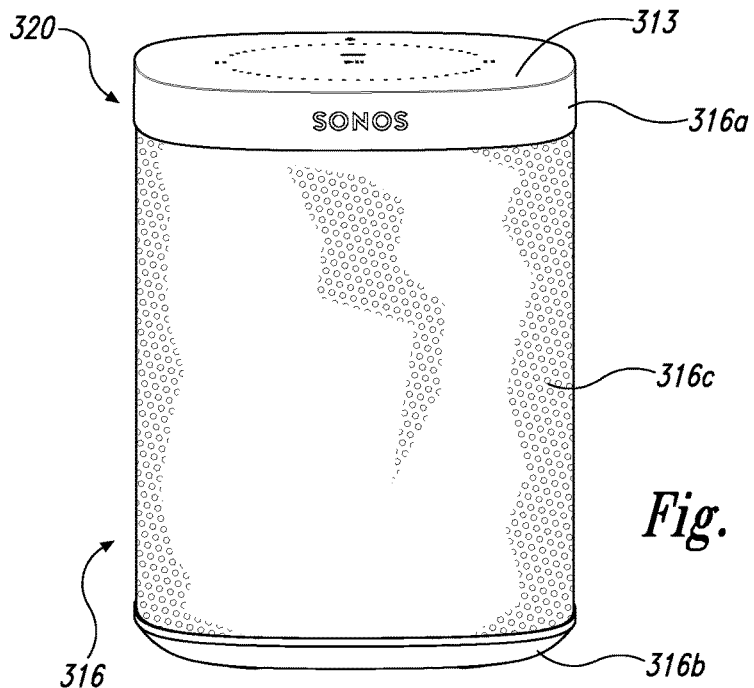
FIG. 3A shows a front view of a network microphone device configured in accordance with aspects of the disclosed technology.
Figure 3B:
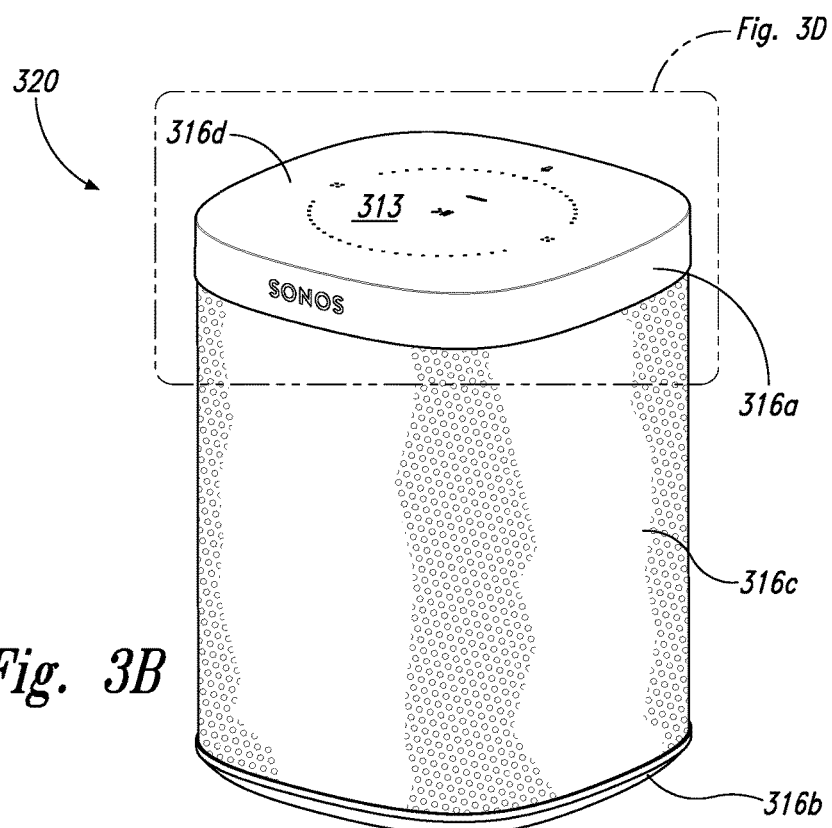
FIG. 3B shows a side isometric view of the network microphone device of FIG. 3A.
Figure 3C:
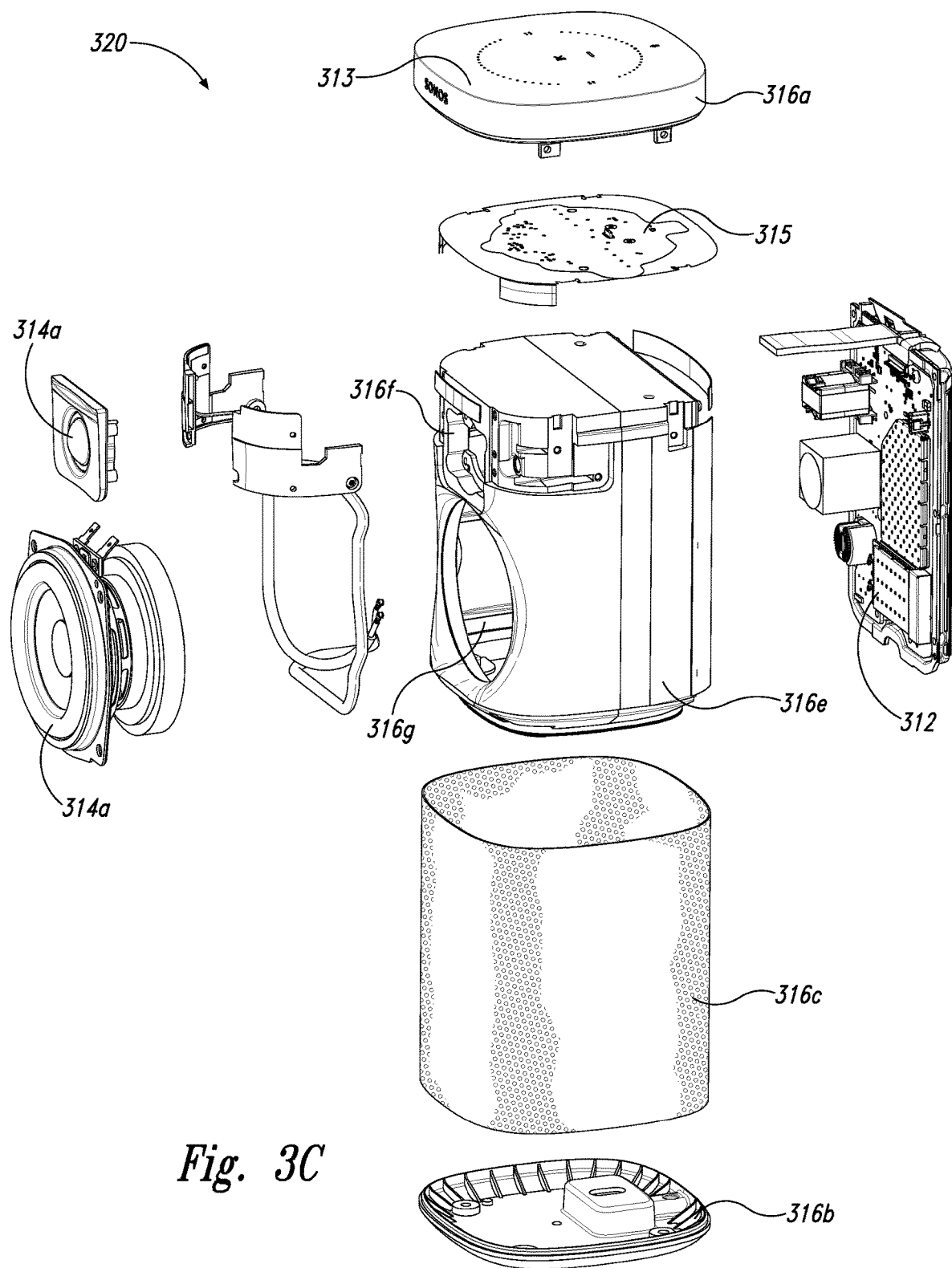
FIG. 3C shows an exploded view of the network microphone device of FIGS. 3A and 3B.
Figure 3D:
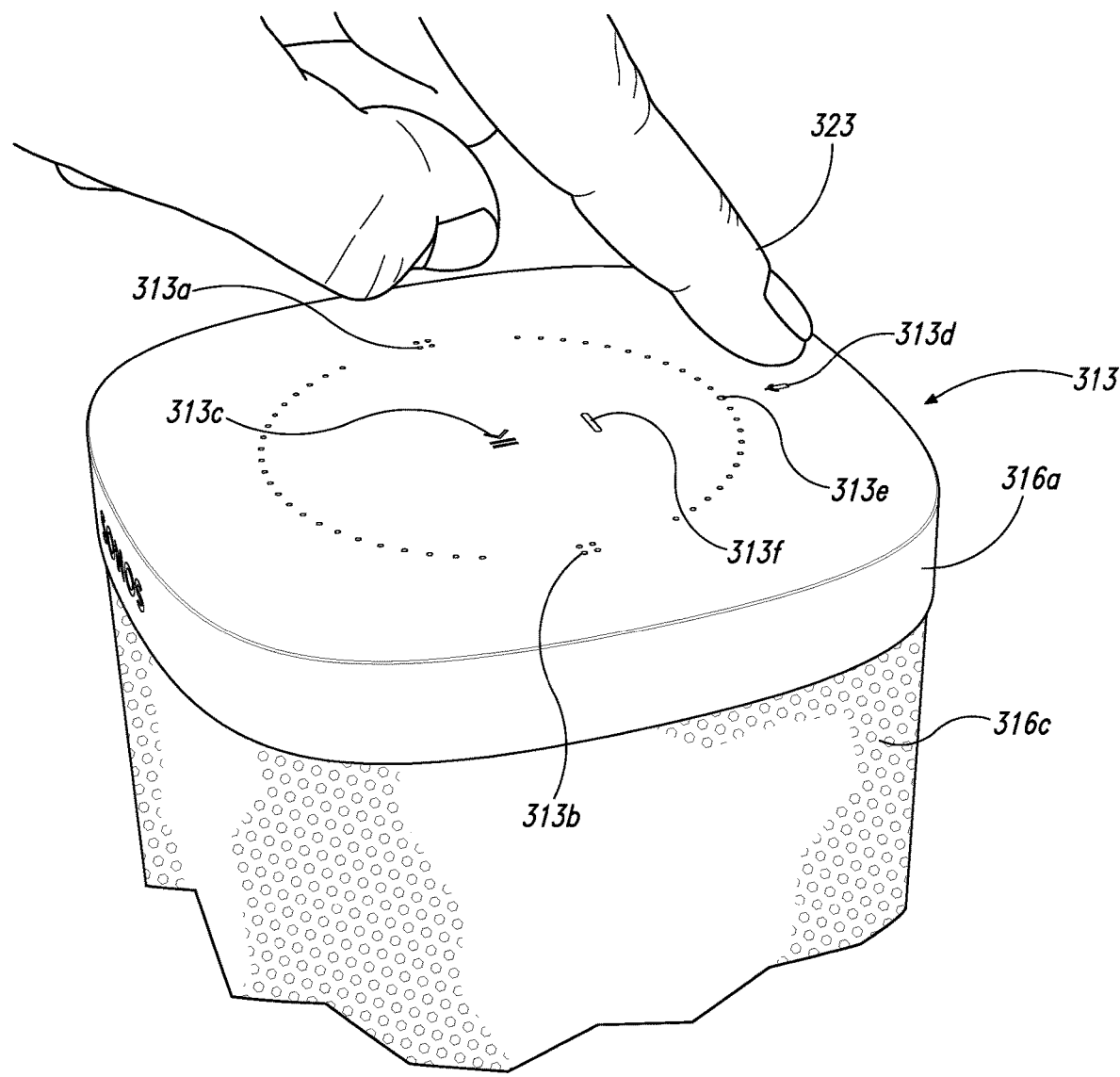
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1), a remote server (e.g., one or more of the remote computing devices 106 of FIG. 1), etc. In certain embodiments, however, the NMD 320 determines and/or performs one or more actions corresponding to the one or more voice commands without intervention or involvement of an external device, computer, or server.

Figure 3E:
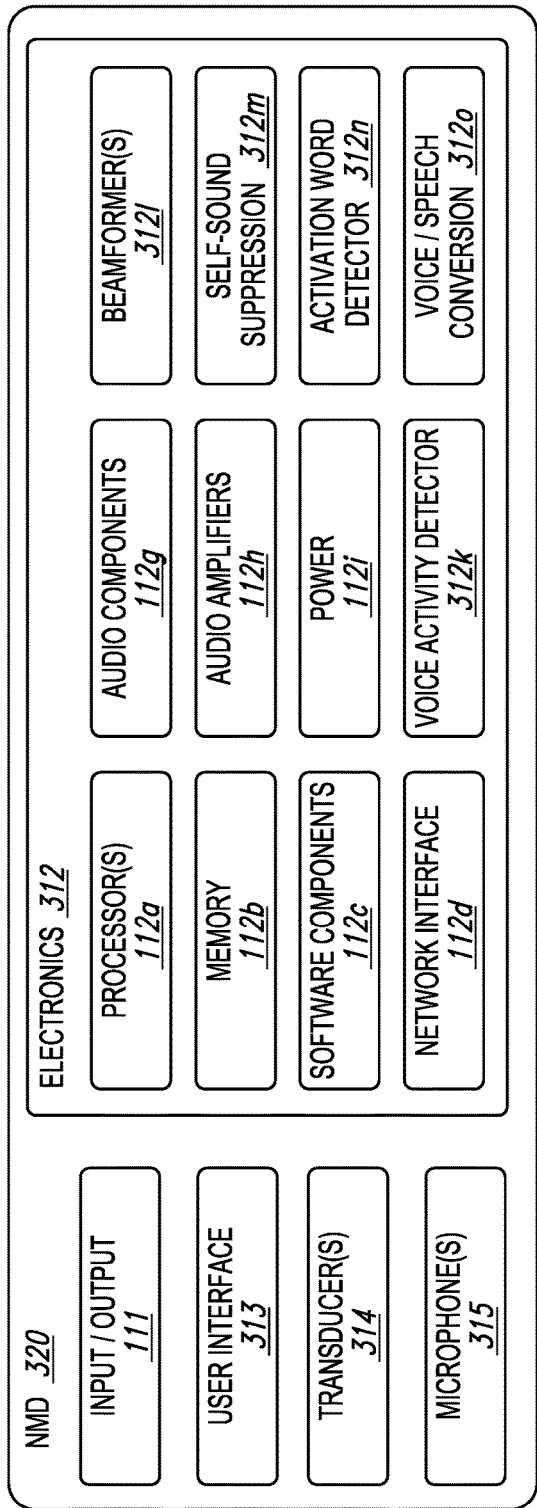
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
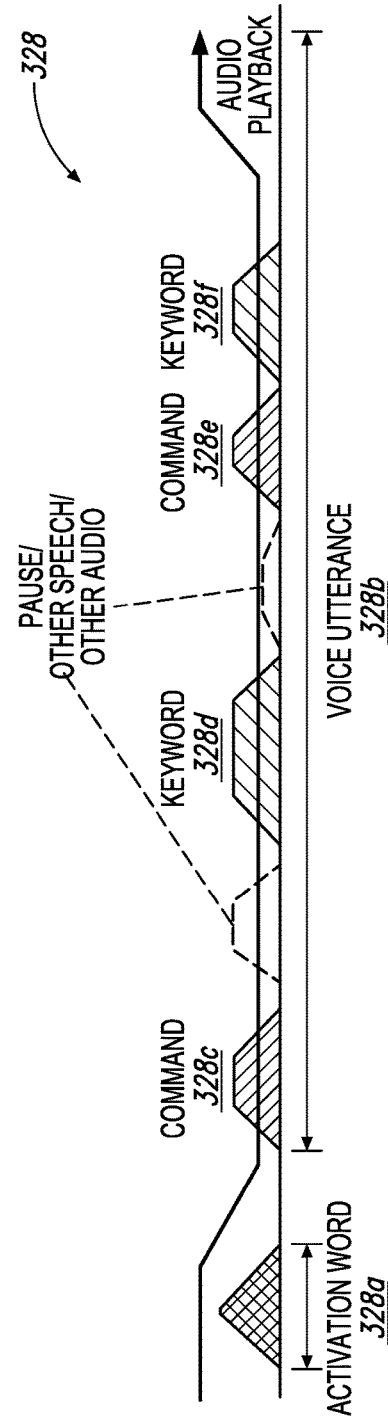
FIG. 3F shows a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
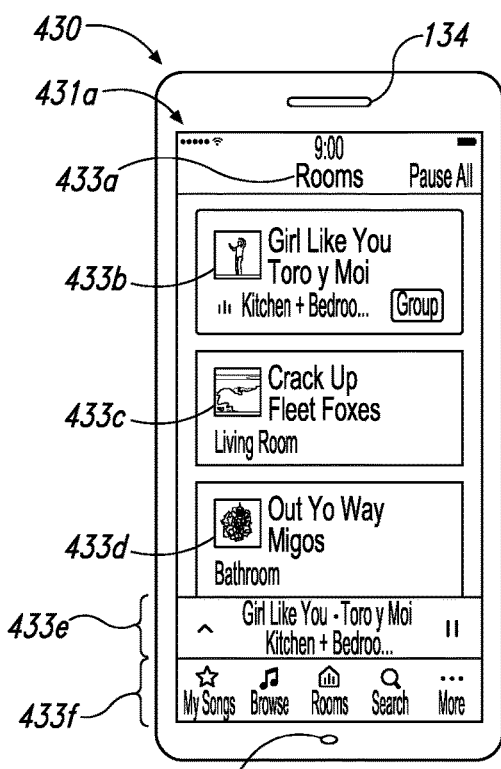
FIGS. 4A-4D show schematic diagrams of a control device in various stages of operation in accordance with aspects of the disclosed technology.
Figure 4B:
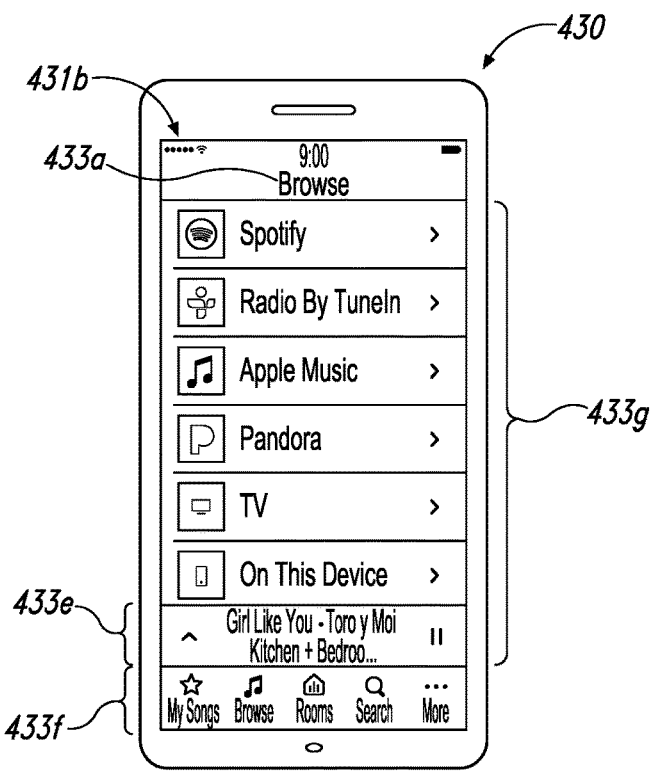
Figure 4C:
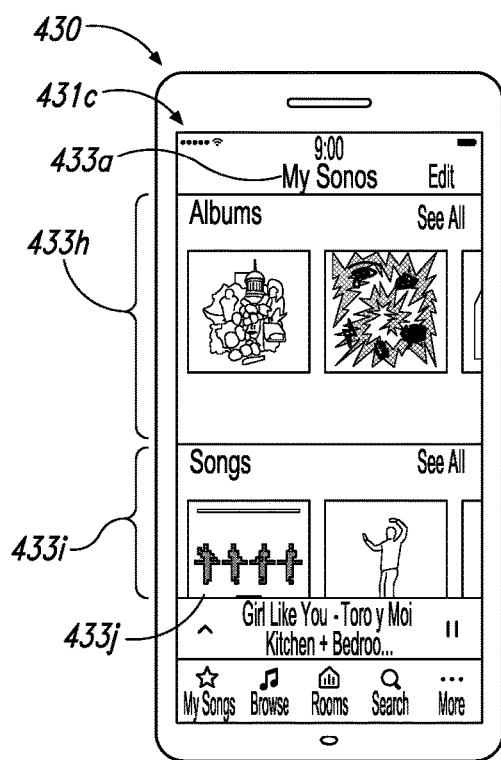
Figure 4D:
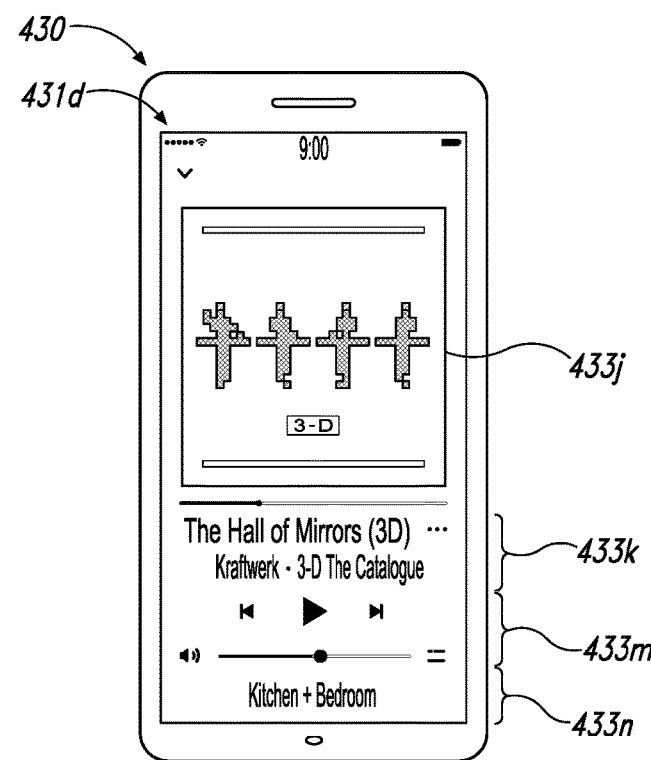

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
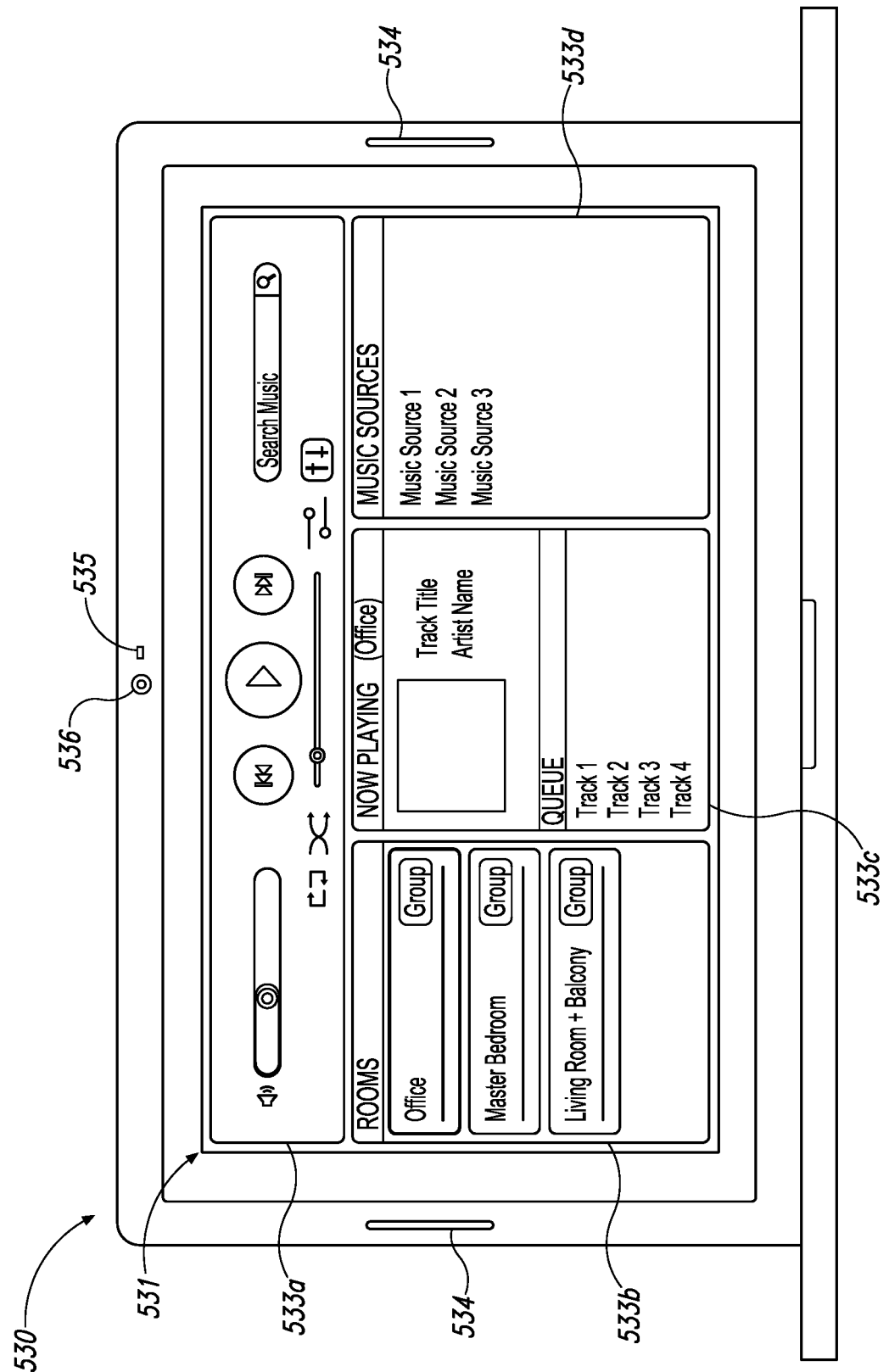
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
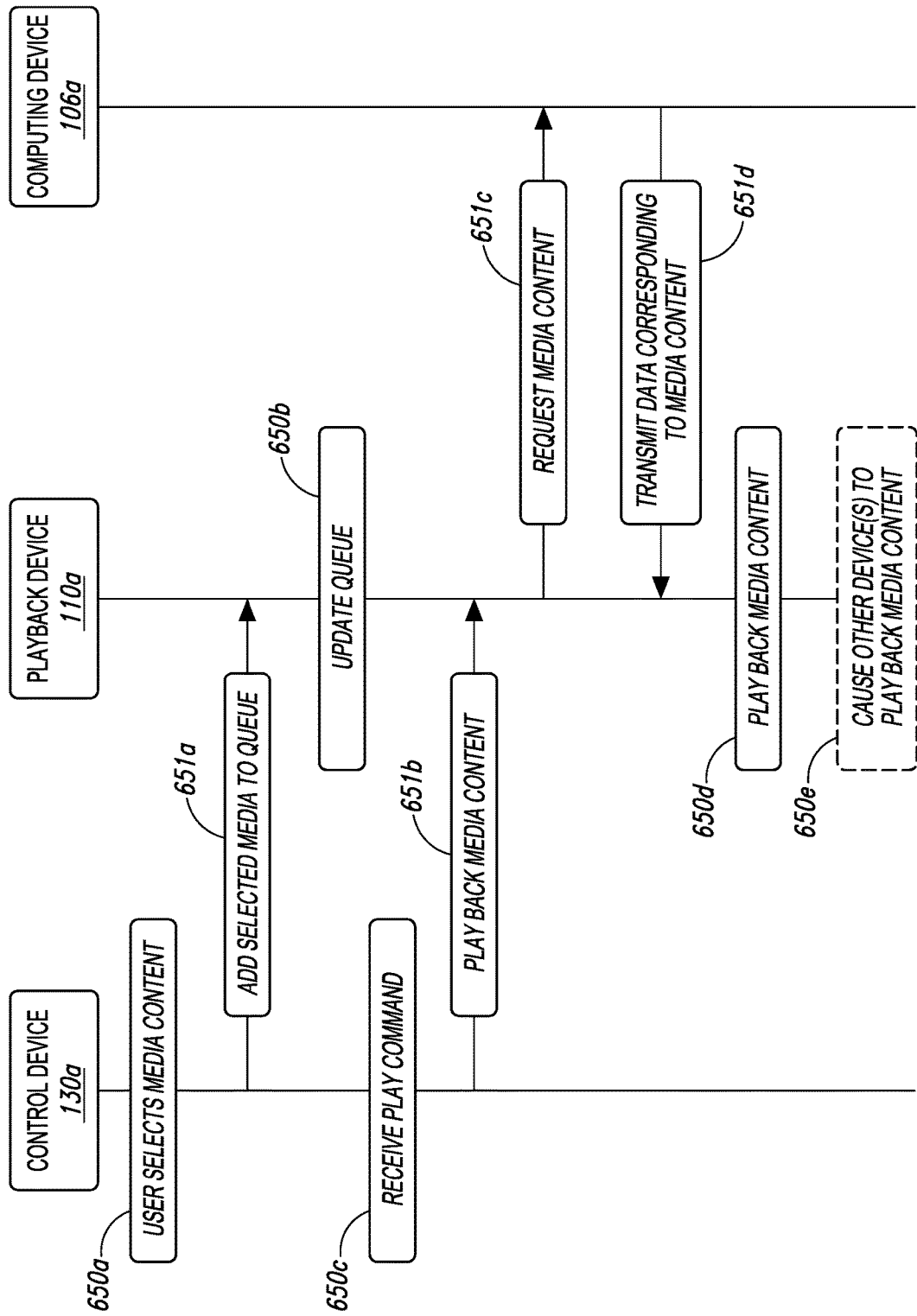
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Overview of Example Embodiments

As mentioned above, is desirable to configure multiple playback devices into a playback group configured to play audio content with each other in a groupwise fashion. In some embodiments, a group of playback devices playing audio content with each other in a groupwise fashion comprises the group of playback devices playing the audio content in synchrony with each other.

Some playback devices are configurable to operate in a station mode (or infrastructure mode) where an individual playback device communicates with one or more other playback devices via a network access point, e.g., a wireless/wired network router, network switch, or other network infrastructure component.

Some playback devices are configurable to operate in a peer-to-peer mode (or ad-hoc mode) where an individual playback device communicates with one or more other playback devices via a peer-to-peer (or ad-hoc) network link, where communications are transmitted between two or more playback devices without traversing a network access point. In operation, the peer-to-peer network links may include one or more radio frequency communications links, infrared communications links, ultrasonic communications links, and/or other communications links suitable for transmitting and receiving data.

Still further playback devices are configurable to switch between operating in either a station/infrastructure mode or a peer-to-peer/ad-hoc/mesh mode, depending on network topologies, available network infrastructure, and/or wireless network capacity or network conditions. And some playback devices are configured to operate in a hybrid mode, where an individual playback device (i) transmits and/or receives at least some information with one or more other playback devices via a network access point and (ii) transmits and/or receives at least some information with one or more other playback devices with one or more peer-to-peer network (or ad-hoc) links without traversing a network access point.

In some embodiments, a playback group includes a group coordinator and one or more group members. In some embodiments, the group coordinator and the group members are playback devices. In some embodiments, the group coordinator is or comprises a laptop computer, tablet computer, smartphone or other computing device, and the group members are playback devices.

In operation, the group coordinator performs functions for initiating and controlling groupwise playback of audio content by (i) the group members or (ii) the group coordinator and the group members.

In some embodiments, the group coordinator functions include (i) obtaining audio information from an audio source, (ii) generating playback timing for the audio information, where the playback devices in the playback group (including the group coordinator in some embodiments) use the audio information and the playback timing to play audio content based on the audio information in a groupwise fashion, including but not limited to playing the audio content based on the audio information in synchrony with the other playback devices in the playback group, and (iii) transmitting the audio information and the playback timing information to all the playback devices in the playback group.

In some embodiments, the group coordinator functions additionally include distributing clock timing to all the playback devices in the playback group, where the playback devices in the playback group (including the group coordinator in some embodiments) use the clock timing, the audio information, and the playback timing to play audio content based on the audio information in a groupwise fashion, including but not limited to playing the audio content based on the audio information in synchrony with the other playback devices in the playback group. In some embodiments, however, clock timing or some other common clock reference may be generated and provided by a device other than the group coordinator. For example, in some embodiments, the clock timing may be provided by another group member or perhaps another device separate from the playback group.

V. Technical Features

In some embodiments, at least some aspects of the technical solutions derive from the technical structure and organization of the audio information, the playback timing, and clock timing that the playback devices use to play audio content from audio sources in synchrony with each other or in some other groupwise fashion, including how playback devices generate and/or use playback timing based on clock timing and play audio content based on playback timing and clock timing.

Therefore, to aid in understanding certain aspects of the disclosed technical solutions, certain technical details of the audio information, playback timing, and clock timing, as well as how playback devices generate and/or use playback timing and clock timing for playing audio content are described below. Except where noted, the technical details of the audio information, playback timing, and clock timing described below are the same or at least substantially the same for the examples shown and described herein with reference to FIGS. 7 and 8.

a. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In some embodiments, a group coordinator (sometimes referred to as a "sourcing" device) obtains any of the aforementioned types of audio content from an audio source via an interface on the group coordinator, e.g., one of the group coordinator's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a group coordinator or playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

As mentioned earlier, a playback device that receives or otherwise obtains audio information from an audio source for playback and/or distribution to other playback devices in a playback group is sometimes referred to herein as the group coordinator or "sourcing" device for the playback group. One function of the group coordinator of a playback group is to process received audio information for playback and/or distribution to group members of the playback group for groupwise playback. In some embodiments, the group coordinator transmits the processed audio information to all the other group members in the playback group. In some embodiments, the group coordinator transmits the audio information to a multicast network address, and all the group member playback devices configured to play the audio content (i.e., the group members of the playback group) receive the audio information via that multicast address. In some embodiments, the group coordinator transmits the audio content to the group members via the playback group's multicast address and/or individual group members' unicast network addresses, depending on each group member's configured networking mode. For example, in some embodiments, (i) for the group members operating in the peer-to-peer/ad-hoc/mesh mode described above, the group coordinator transmits packets comprising the audio content to the multicast network address for the playback group, and (ii) for each group member operating in the station/infrastructure mode, the group coordinator transmits packets comprising the audio information to a unicast network address of the group member.

In some embodiments, the group coordinator receives audio information from an audio source in digital form, e.g., via a stream of packets. In some embodiments, individual packets in the stream have a sequence number or other identifier that specifies an ordering of the packets. In operation, the group coordinator uses the sequence number or other identifier to detect missing packets and/or to reassemble the packets of the stream in the correct order before performing further processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out.

For example, in some embodiments, individual packets from an audio source may include both a timestamp and a sequence number. The timestamp is used to place the incoming packets of audio information in the correct order, and the sequence number is mainly used to detect packet losses. In operation, the sequence numbers increase by one for each Real-time Transport Protocol (RTP) packet transmitted from the audio source, and timestamps increase by the time "covered" by an RTP packet. In instances where a portion of audio content is split across multiple RTP packets, multiple RTP packets can have the same timestamp.

In some embodiments, the group coordinator does not change the sequence number or identifier of a received packet during processing. In some embodiments, the group coordinator reorders at least a first set of packets in a first packet stream received from an audio source (an inbound stream) based on each packet's sequence identifier, extracts audio information from the received packets, reassembles a bitstream of audio information from the received packets, and then repacketizes the reassembled bitstream into a second set of packets (an outbound stream), where packets in the second set of packets have sequence numbers and/or timestamps that differ from the sequence numbers and/or timestamps of the packets in the first set of packets (or first stream).

In some embodiments, individual packets in the second stream are a different length (i.e., shorter or longer) than individual packets in the first stream. In some embodiments, reassembling a bitstream from the incoming packet stream and then subsequently repacketizing the reassembled bitstream into a different set of packets facilitates uniform processing and/or transmission of audio content by the group coordinator and uniform processing by the group members that receive the audio information from the group coordinator. However, for some delay-sensitive audio information, reassembly and repacketization may be undesirable, and therefore, in some embodiments, the group coordinator may not perform reassembly and repacketization for some (or all) audio information that it receives before playing the audio information and/or transmitting the audio information to other playback devices/group members.

In some embodiments an audio source provides audio information in digital form to a group coordinator, e.g., via a digital line-in interface. In such embodiments, the group coordinator packetizes the digital audio into packets of audio information before transmitting the audio information to other playback devices. In some embodiments, individual packets comprise a sequence number or other identifier so that, when other playback devices receive the audio information, those other playback devices will be able to reliably arrange the received packets in the correct order before performing further packet processing.

b. Playback Timing

In some embodiments, the playback devices disclosed and described herein use playback timing to play audio content in synchrony with each other. An individual playback device can generate playback timing and/or playback audio content according to playback timing, based on the playback device's configuration in the playback group. The sourcing playback device (acting as a group coordinator) that generates the playback timing for audio content also transmits that generated playback timing to all the playback devices that are configured to play the audio content (the group members).

In some embodiments, the group coordinator transmits playback timing separately from the audio information. In some embodiments, the group coordinator transmits the playback timing to all the group members by transmitting the playback timing to a multicast network address for the playback group, and all the group members receive the playback timing via the playback group's multicast address. In some embodiments, the group coordinator transmits the playback timing to each group member by transmitting the playback timing to each group member's unicast network address. In operation, the playback timing may be transmitted via infrastructure and/or peer-to-peer communications links.

In some embodiments, the playback timing is generated for individual frames (or packets) of audio information. As described above, in some embodiments, the audio information is packaged in a series of frames (or packets) where individual frames (or packets) comprise a portion of the audio information. In some embodiments, the playback timing for the audio information includes a playback time for each frame (or packet) of audio information. In some embodiments, the playback timing for an individual frame (or packet) is included within the frame (or packet), e.g., in the header of the frame (or packet), in an extended header of the frame (or packet), and/or in the payload portion of the frame (or packet). Accordingly, in some embodiments, (i) for the group members operating in the peer-to-peer/ad-hoc/mesh mode, the group coordinator transmits packets comprising audio information and playback timing to the multicast network address for the playback group, and (ii) for each group member operating in the station/infrastructure mode, the group coordinator transmits packets comprising the audio information and the playback timing to the unicast network address of the group member.

In some embodiments, the playback time for an individual frame (or packet) is identified within a timestamp or other indication. In such embodiments, the timestamp (or other indication) represents a time to play the one or more portions of audio information within that individual frame (or packet).

In operation, when the playback timing for an individual frame (or packet) is generated, the playback timing for that individual frame (or packet) is a future time relative to a current clock time of a reference clock at the time that the playback timing for that individual frame (or packet) is generated.

In operation, a playback device tasked with playing particular audio content will play the portion(s) of the particular audio content within an individual frame (or packet) at the playback time specified by the playback timing for that individual frame (or packet), as adjusted to accommodate for differences between the clock timing and a clock at the playback device that is tasked with playing the audio content, as describe in more detail below.

c. Clock Timing

The playback devices disclosed and described herein use clock timing to generate playback timing for audio information and to play the audio content based on the audio information and the generated playback timing.

In some embodiments, the group coordinator uses clock timing from a reference clock (e.g., a device clock, a digital-to-audio converter clock, a playback time reference clock, or any other clock) to generate playback timing for audio information that the group coordinator receives from an audio source. The reference clock can be a "local" clock at the group coordinator or a "remote" clock at a separate network device, e.g., another playback device, a computing device, or another network device configured to provide clock timing for use by (i) a group coordinator to generate playback timing and/or (ii) the group coordinator and group members to play back audio content.

In some embodiments, all of the playback devices tasked with playing particular audio content in synchrony (i.e., all the group members in a playback group) use the same clock timing from the same reference clock to play back that particular audio content in synchrony with each other. In some embodiments, playback devices use the same clock timing to play audio content that was used to generate the playback timing for the audio content. The reference clock may be a local clock of the group coordinator, but the reference clock could also be a clock at a different device, including a different playback device.

In operation, the device that generates the clock timing also transmits the clock timing to all the playback devices in the network that need to use the clock timing for generating playback timing and/or playing back audio content. In some embodiments, the device that generates the clock timing (e.g., the group coordinator in some embodiments) transmits the clock timing to a multicast network address, and all the playback devices configured to generate playback timing and/or play audio content (e.g., the group coordinator and/or the group members) receive the clock timing via that multicast address. In some embodiments, the device that generates the clock timing alternatively transmits the clock timing to each unicast network address of each playback device in the playback group.

In some embodiments, the device that generates the clock timing is a playback device configured to operate as the group coordinator for the playback group. And in operation, the group coordinator of the playback group transmits the clock timing to all the group members of the playback group. The group coordinator and the group members all use the clock timing and the playback timing to play audio content in a groupwise manner. In some embodiments, the group coordinator and the group members all use the clock timing and the playback timing to play audio content in synchrony with each other.

In some embodiments, and as described further herein, the group coordinator (or other network device configured to provide clock timing to a playback group) transmits clock timing to one or more group members via two or more communications links. In some embodiments, a first communications link of the two or more communications links comprises an infrastructure link and a second communications link of the two or more communications links comprises a peer-to-peer link. In other embodiments, the first and second communications links may each comprise separate infrastructure links, or the first and second communications links may each comprise separate peer-to-peer links.

d. Generating Playback Timing by the Group Coordinator

In some embodiments, the group coordinator: (i) generates playback timing for audio information based on clock timing from a local clock at the group coordinator, and (ii) transmits the generated playback timing to all the other group members in the playback group. In operation, when generating playback timing for an individual frame (or packet), the group coordinator adds a "timing advance" to the current clock time of a local clock at the group coordinator that the group coordinator is using for generating the playback timing.

In some embodiments, the "timing advance" is based on an amount of time that is greater than or equal to the sum of (i) the network transit time required for frames and/or packets comprising audio information transmitted from the group coordinator to arrive at all the other group members and (ii) the amount of time required for all the other group members to process received frames/packets from the group coordinator for playback.

In some embodiments, the group coordinator determines a timing advance by sending one or more test packets to one or more (or perhaps all) of the other group members, and then receiving test response packets back from those one or more group members. In some embodiments, the group coordinator and the one or more group members negotiate a timing advance via multiple test and response messages. In some embodiments with more than two group members, the group coordinator determines a timing advance by exchanging test and response messages with all of the group members, and then setting a timing advance that is sufficient for the group member having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined, or at least constant for the duration of a synchronous playback session. In other embodiments, the group coordinator can change the timing advance in response to a request from a group member indicating that a greater timing advance is required (e.g., because the group member is not receiving packets comprising portions of audio content until after one or more other group members have already played the portions of audio content) or a shorter timing advance would be sufficient (e.g., because the group member is buffering more packets comprising portions of audio content than necessary to provide consistent, reliable playback).

As described in more detail below, all the playback devices in a playback group configured to play the audio content in synchrony will use the playback timing and the clock timing to play the audio content in synchrony with each other.

e. Generating Playback Timing with Clock Timing from a Remote Clock

In some embodiments, the group coordinator may generate playback timing for audio information based on clock timing from a remote clock at another network device, e.g., another playback device, another computing device (e.g., a smartphone, laptop, media server, or other computing device configurable to provide clock timing sufficient for use by the group coordinator generate playback timing and/or playback audio content). Generating playback timing based on clock timing from a remote clock at another network device is more complicated than generating playback timing based on clock timing from a local clock in embodiments where the same clock timing is used for both (i) generating playback timing and (ii) playing audio content based on the playback timing.

In embodiments where the group coordinator generates playback timing for audio information based on clock timing from a remote cock, the playback timing for an individual frame (or packet) is based on (i) a "timing offset" between (a) a local clock at the group coordinator that the group coordinator uses for generating the playback timing and (b) the clock timing from the remote reference clock, and (ii) a "timing advance" based on an amount of time that is greater than or equal to the sum of (a) the network transit time required for packets transmitted from the group coordinator to arrive at the group members and (b) the amount of time required for all of those group members to process frames and/or packets comprising audio information received from the group coordinator for playback.

For an individual frame (or packet) containing a portion(s) of the audio information, the group coordinator generates playback timing for that individual frame (or packet) by adding the sum of the "timing offset" and the "timing advance" to a current time of the local clock at the group coordinator that the group coordinator uses to generate the playback timing for the audio information. In operation, the "timing offset" may be a positive or a negative offset, depending on whether the local clock at the group coordinator is ahead of or behind the remote clock providing the clock timing. The "timing advance" is a positive number because it represents a future time relative to the local clock time, as adjusted by the "timing offset."

By adding the sum of the "timing advance" and the "timing offset" to a current time of the local clock at the group coordinator that the group coordinator is using to generate the playback timing for the audio information, the group coordinator is, in effect, generating the playback timing relative to the remote clock.

In some embodiments, and as described above, the "timing advance" is based on an amount of time that is greater than or equal to the sum of (i) the network transit time required for frames and/or packets comprising audio information transmitted from the group coordinator to arrive at all other group members and (ii) the amount of time required for all the other group members to process received frames/packets from the sourcing playback device for playback.

In some embodiments, the group coordinator determines a timing advance via signaling between the group coordinator and one or more group members, as described previously. Further, in some embodiments, the timing advance is less than about 50 milliseconds, less than about 20-30 milliseconds, or less than about 10 milliseconds, depending on the audio content playback latency requirements because different audio content may have different latency requirements. For example, audio content having associated video content may have lower latency requirements than audio content that does not have associated video content because audio content associating with video content must be synchronized with its corresponding video content whereas audio content that is not associated with video content need not be synchronized with any corresponding video content. In some embodiments, the timing advance remains constant after being determined, or at least constant for the duration of a playback session. And in some embodiments, the group coordinator can change the timing advance based on further signaling between the group coordinator (generating the playback timing) and one or more group members (that are using the playback timing to play audio content).

As described in more detail below, all the playback devices configured to play the audio content in synchrony will use the playback timing and the clock timing to play the audio content in synchrony with each other.

f. Playing Audio Content using Local Playback Timing and Local Clock Timing

In some embodiments, the group coordinator is configured to play audio content in synchrony with one or more group members. And if the group coordinator is using clock timing from a local clock at the group coordinator to generate the playback timing, then the group coordinator will play the audio content using locally-generated playback timing and the locally-generated clock timing. In operation, the group coordinator plays an individual frame (or packet) comprising portions of the audio information when the local clock that the group coordinator used to generate the playback timing reaches the time specified in the playback timing for that individual frame (or packet).

For example, recall that when generating playback timing for an individual frame (or packet), the group coordinator device adds a "timing advance" to the current clock time of the reference clock used for generating the playback timing. In this instance, the reference clock used for generating the playback timing is a local clock at the group coordinator. So, if the timing advance for an individual frame is, for example, 30 milliseconds, then the group coordinator plays the portion (e.g., a sample or set of samples) of audio information in an individual frame (or packet) 30 milliseconds after creating the playback timing for that individual frame (or packet).

In this manner, the group coordinator plays audio content based on the audio information by using locally-generated playback timing and clock timing from a local reference clock at the group coordinator. As described further below, by playing the portion(s) of the audio information of an individual frame and/or packet when the clock time of the local reference clock reaches the playback timing for that individual frame or packet, the group coordinator plays that portion(s) of the audio content corresponding to the audio information in that individual frame and/or packet in synchrony with other group members in the playback group.

g. Playing Audio Content using Local Playback Timing and Remote Clock Timing

As mentioned earlier, in some embodiments, a group coordinator generates playback timing for audio information based on clock timing from a remote clock, i.e., a clock at another network device separate from the group coordinator, e.g., another playback device, or another computing device (e.g., a smartphone, laptop, media server, or other computing device configurable to provide clock timing sufficient for use by a playback device generate playback timing and/or playback audio content). Because the group coordinator used clock timing from the remote clock to generate the playback timing for the audio content, the group coordinator also uses the clock timing from the remote clock to play the audio content. In this manner, the group coordinator plays audio content using the locally-generated playback timing and the clock timing from the remote clock.

Recall that, in embodiments where the group coordinator generates playback timing for audio content based on clock timing from a remote clock, the group coordinator generates the playback timing for an individual frame (or packet) based on (i) a "timing offset" based on a difference between (a) a local clock at the group coordinator and (b) the clock timing from the remote clock, and (ii) a "timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio information received from the group coordinator for playback. And further recall that the group coordinator transmits the generated playback timing to all of the group members in the playback group tasked with playing the audio content in synchrony.

In this scenario, to play an individual frame (or packet) of audio content in synchrony with the one or more other group member playback devices, the group coordinator subtracts the "timing offset" from the playback timing for that individual frame (or packet) to generate a "local" playback time for playing the audio content based on the audio information within that individual frame (or packet). After generating the "local" playback time for playing the portion(s) of the audio content corresponding to the audio information within the individual frame (or packet), the group coordinator plays the portion(s) of the audio content corresponding to the audio information in the individual frame (or packet) when the local clock that the group coordinator is using to play the audio content reaches the "local" playback time for that individual frame (or packet). By subtracting the "timing offset" from the playback timing to generate the "local" playback time for an individual frame, the group coordinator effectively plays the portion(s) of audio content corresponding to the audio information in that frame/packet with reference to the clock timing from the remote clock.

h. Playing Audio Content using Remote Playback Timing and Local Clock Timing

Recall that, in some embodiments, the group coordinator transmits the audio information and the playback timing for the audio information to one or more group members. If the group member that receives (i.e., the receiving group member) the audio information and playback timing from the group coordinator is the same group member that provided clock timing to the group coordinator that the group coordinator used for generating the playback timing, then the receiving group member in this instance plays audio content using the audio information and playback timing received from the group coordinator (i.e., remote playback timing) and the group member's own clock timing (i.e., local clock timing). Because the group coordinator used clock timing from a clock at the receiving group member to generate the playback timing, the receiving group member also uses the clock timing from its local clock to play the audio content. In this manner, the receiving group member plays audio content using the remote playback timing (i.e., from the group coordinator) and the clock timing from its local clock (i.e., its local clock timing).

To play an individual frame (or packet) of the audio information in synchrony with the group coordinator (and every other playback device that receives the playback timing from the group coordinator and clock timing from the receiving group member), the receiving group member (i) receives the frames (or packets) comprising the portions of the audio information from the group coordinator, (ii) receives the playback timing for the audio information from the group coordinator (e.g., in the frame and/or packet headers of the frames and/or packets comprising the portions of the audio information or perhaps separately from the frames and/or packets comprising the portions of the audio information), and (iii) plays the portion(s) of the audio information in the individual frame (or packet) when the local clock that the receiving group member used to generate the clock timing reaches the playback time specified in the playback timing for that individual frame (or packet) received from the group coordinator.

Because the group coordinator uses the "timing offset" (which is the difference between the clock timing at the receiving group member and the clock timing at the group coordinator in this scenario) when generating the playback timing, and because this "timing offset" already accounts for differences between timing at the group coordinator and the receiving group member, the receiving group member in this scenario plays individual frames (or packets) comprising portions of the audio information when the receiving group member's local clock (that was used to generated the clock timing) reaches the playback time for an individual frame (or packet) specified in the playback timing for that individual frame (or packet).

And because the receiving group member plays frames (or packets) comprising portions of the audio information according to the playback timing, and because the group coordinator plays the same frames (or packets) comprising portions of the audio information according to the playback timing and the determined "timing offset," the receiving group member and the group coordinator play the same frames (or packets) comprising audio information corresponding to the same portions of audio content in synchrony, i.e., at the same time or at substantially the same time.

i. Playing Audio Content using Remote Playback Timing and Remote Clock Timing

Recall that, in some embodiments, the sourcing playback device (e.g., which in many cases may be the group coordinator) transmits the audio information and the playback timing for the audio information to one or more other playback devices in the synchrony group. And further recall that, in some embodiments, the network device providing the clock timing can be a different device than the playback device providing the audio information and playback timing (i.e., the sourcing playback device, which in many cases may be the group coordinator). Playback devices that receive the audio information, the playback timing, and the clock timing from one or more other devices are configured to playback the audio content using the playback timing from the device that provided the playback timing (i.e., remote playback timing) and clock timing from a clock at the device that provided the clock timing (i.e., remote clock timing). In this manner, the receiving group member playback device in this instance plays audio content based on audio information by using remote playback timing and remote clock timing.

To play an individual frame (or packet) of the audio information in synchrony with every other playback device tasked with playing audio content in the playback group, the receiving playback device (i) receives the frames (or packets) comprising the portions of the audio information, (ii) receives the playback timing for the audio information (e.g., in the frame and/or packet headers of the frames and/or packets comprising the portions of the audio information or perhaps separately from the frames and/or packets comprising the portions of the audio information), (iii) receives the clock timing, and (iv) plays the portion(s) of the audio information in the individual frame (or packet) when the local clock that the receiving playback device uses for audio content playback reaches the playback time specified in the playback timing for that individual frame (or packet), as adjusted by a "timing offset."

In operation, after the receiving playback device receives clock timing, the receiving device determines a "timing offset" for the receiving playback device. This "timing offset" comprises (or at least corresponds to) a difference between the "reference" clock that was used to generate the clock timing and a "local" clock at the receiving playback device that the receiving playback device uses to play the audio content. In operation, each playback device that receives the clock timing from another device calculates its own "timing offset" based on the difference between its local clock and the clock timing, and thus, the "timing offset" that each playback device determines is specific to that particular playback device.

In some embodiments, when playing back the audio content, the receiving playback device generates new playback timing (specific to the receiving playback device) for individual frames (or packets) of audio information by adding the previously determined "timing offset" to the playback timing for each received frame (or packet) comprising portions of audio information. With this approach, the receiving playback device converts the playback timing for the received audio information into "local" playback timing for the receiving playback device. Because each receiving playback device calculates its own "timing offset,"

each receiving playback device's determined "local" playback timing for an individual frame is specific to that particular playback device.

And when the "local" clock that the receiving playback device is using for playing back the audio content reaches the "local" playback time for an individual frame (or packet), the receiving playback device plays the audio information (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving playback device plays frames (or packets) comprising portions of the audio information according to the playback timing as adjusted by the "timing offset" relative to the clock timing, and because the device providing the playback timing generated the playback timing for those frames (or packets) relative to the clock timing and plays the same frames (or packets) comprising portions of the audio information according to the playback timing and its determined "timing offset," the receiving playback device and the device that provided the playback timing (e.g., the group coordinator in some embodiments) play the same frames (or packets) comprising the same portions of the audio information in synchrony with each other, i.e., at the same time or at substantially the same time.

VI. Example Embodiments

The example embodiments described herein illustrate playback devices configured to, among other features, (i) generate and transmit clock timing to one or more other playback devices via two or more communications links (e.g., simultaneously or via one communication link at a time), (ii) receive clock timing via two or more communications links (e.g., simultaneously or via one communication link at a time) and use the clock timing received via the two or more communications links for clock synchronization and/or synchronous playback of audio content.

In operation, the clock timing comprises a relatively small amount of data compared to the audio information and other data traversing a Wireless Local Area Network (WLAN). However, the clock timing can be sensitive to network quality, in contrast to the audio itself, which is larger in-size and less sensitive to network quality.

To improve reliability and timeliness of clock timing transmissions, some embodiments augment the transmission of the clock timing over the WLAN with clock timing additionally transmitted over a second communications link. Typically, the second communications link has more favorable network properties, such as lower latency, fewer collisions and retransmissions, etc. In some configurations, the second communications link is a peer-to-peer communications link.

The playback devices that receive the clock timing via the two communications links are configured to fuse or otherwise combine the clock timing received via the two (or perhaps more) communications links together. Given that the clock timing information received via different communication links is typically subjected to different noise (e.g., uncorrelated noise), combining the clock timing information from these different communication links may advantageously results in a better estimate of the true clock time, which can, in turn, improve synchronization of clocks and/or synchronization of audio playback between and among the playback devices.

In some embodiments, the additional communications link does not need to be a high-reliability link that all of the playback devices in the playback group can access. For example, some playback devices can use the clock timing received via the WLAN (the primary link) as a baseline for synchronization (of clocks and/or playback) and use the additional clock timing via the other communications link (the secondary link) when available to improve their synchronization (of clocks and/or playback).

In some embodiments, a group coordinator for a playback group operates as an SNTP server for the group members (operating as SNTP clients), thereby providing clock timing to the group members via the WLAN. The group coordinator also transmits clock timing via a second communications link, such as via an acoustic signal (e.g., an ultrasonic signal), a light signal (e.g., an infrared light signal), and/or another radio frequency signal (separate from the WLAN).

The group members that receive the clock timing via the second communications link (e.g., group members that may be in the same room as the group coordinator so as to detect an ultrasonic signal, have an unobstructed line-of-sight for an infrared light signal, and/or detect a lower power RF signal such as Bluetooth, Zigbee, Ultra-Wideband (UWB) or other suitable RF signal) can use the clock timing received via the second communications link to improve the quality of their synchronization. Generally, group members in the same room as the group coordinator (and perhaps within the same bonded zone such as stereo pair/home theater) that are likely able to receive the clock timing via the second communications link are also the group members where a lack of tight synchronization would be most noticeable. And other group members in other rooms and/or further away that may be less likely to receive the clock timing via the second communications link are also the group members where a lack of tight synchronization would be less noticeable.

Playback devices according to some embodiments described herein are configured to combine clock timing received via two or more sources (e.g., SNTP messages received via a first communications channel and clock timing via a second communication channel) using sensor fusion techniques. In some embodiments, a group member comprises a state estimator (e.g., a Kalman filter, extended Kalman filter, or similar state estimator) configured to estimate the clock time of the group coordinator and/or a time error between the group member's clock and the group coordinator based on (i) clock timing information from the packets associated with a timing protocol (e.g., SNTP packets, NTP packets, PTP packets, etc.), which can be noisy, and (ii) clock timing information from one or more secondary channels, which may have noise that is different from (e.g., uncorrelated with) with noise subjected to the packets associated with the timing protocol.

In operation, Kalman filters have a probability distribution for a linear model. A group member uses the Kalman filter to predict what the next clock value should be at time T within an error window having a Gaussian distribution around it of a given spread, or variance. As packets associated with a timing protocol arrive, they have their own probability distributions for their time and their own spread, or variance. The group member can take the two probability distributions, overlap them, and identify an intersecting probability distribution result, which is more accurate than either of the sources individually, and informs the Kalman filter's next update. The embodiments disclosed herein extend this process of overlapping distributions to an arbitrary number of input sources including communications links such as optical, acoustic, or other direct timing links.

Figure 7:
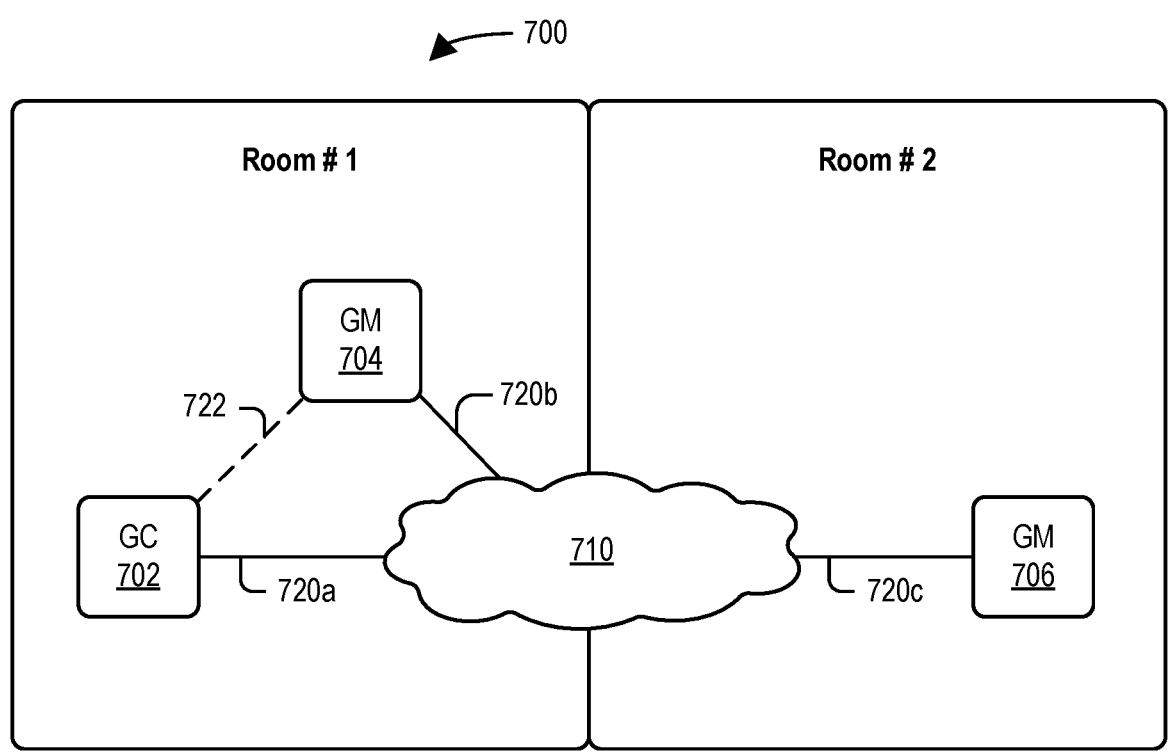
FIG. 7 shows an example configuration of a media playback system configured for clock synchronization and/or synchronous playback based on out-of-band synchronization signaling according to some embodiments.

FIG. 7 shows an example configuration of a media playback system configured for clock synchronization and/or synchronous playback based on out-of-band synchronization signaling according to some embodiments.

The media playback system 700 includes playback devices 702, 704, and 706. In operation, the playback system 700 obtains audio information from an audio source (not shown) for playback in synchrony. The playback devices 702, 704, and 706 may be the same as or similar to any of the playback devices disclosed and described herein. Playback devices 702 and 704 are shown positioned in Room #1 while playback device 706 are shown positioned in Room #2 for illustration purposes only.

Playback devices 702, 704, and 706 are configured to communicate with each other via network 710 and also directly via peer-to-peer communications links.

Playback device 702 comprises (i) a first network interface configured to communicate with other devices connected to network 710 via communications link 720a and (ii) a second network interface configured to communicate with other devices in a peer-to-peer fashion, i.e., without using network 710. Playback device 704 comprises (i) a first network interface configured to communicate with other devices connected to network 710 via communications link 720b and (ii) a second network interface configured to communicate with other devices in a peer-to-peer fashion, i.e., without using network 710. Playback device 706 comprises (i) a first network interface configured to communicate with other devices connected to network 710 via communications link 720b and (ii) a second network interface configured to communicate with other devices in a peer-to-peer fashion, i.e., without using network 710.

Network 710 may be any type of wired or wireless network now known or later developed that is suitable for transmitting and/or receiving data communications. In some embodiments, network 710 is a wireless local area network (WLAN) comprising an access point (not shown) such as a wireless router, switch, or other network infrastructure device. In some embodiments network 710 is WiFi network, such as a 2.4 GHz, 5 GHz, and/or 6 GHz WiFi network. In such embodiments, the first communications interface of playback devices 702, 704, and 706 comprises an WiFi wireless network interface.

The peer-to-peer link 722 is any type of wired or wireless communications link now known or later developed that is suitable for transmitting and/or receiving data communications. In some embodiments, playback device 702 and playback device 704 are configured to communicate with each other over peer-to-peer link 772 via a communications protocol that is different than the communications protocol via which playback devices 702, 704, and 706 use to communicate with each other over network 710. In some embodiments, peer-to-peer link 722 comprises one of (i) a WiFi, ZigBee, Bluetooth, Ultra-wideband (UWB), or other radio frequency (RF) communications link, (ii) a optical (e.g., infrared) communications link, (iii) an acoustic (e.g., ultrasonic) communications link, (iv) a communications link over an electrical power line, or (iv) any other type of communications link suitable for peer-to-peer communications.

In example 700, playback devices 702, 704, and 706 are configured in a playback group, where playback device 702 is configured as a group coordinator for the group, playback device 704 is configured as a group member in the group, and playback device 706 is configured as a group member in the group. In some embodiments, group coordinator 702 may be a computing device different than a playback device, such as a laptop computer, smartphone, tablet computer, smart television, or any other computing device now known or later developed that is suitable for performing one or more of the group coordinator functions disclosed and described herein.

In operation, the group coordinator 702 obtains and distributes audio information from an audio information source (not shown) to the group members 704 and 706 via network 710. The audio information may be any of the various types of audio information from any of the various audio sources disclosed herein. In some embodiments, the audio information is in the form of streaming audio information from a streaming audio source. In some embodiments, the group coordinator 702 additionally generates and distributes playback timing for the audio information according to any of the playback timing generation and distribution methods disclosed herein.

In the example embodiment shown in FIG. 7, the group coordinator 702 additionally generates and distributes clock timing to group members 704 and 706. In this example, the group coordinator 702 transmits clock timing to group members 704 and 706 via network 710, and the group coordinator 702 also transmits clock timing to group member 704 via peer-to-peer communications link 722.

As mentioned previously, group coordinator 702 and group member 704 are positioned in Room #1 and group member 706 is positioned in Room #2 for illustration purposes. Here, peer-to-peer communications link 722 is a short range communications link, so group member 704 is able to receive clock timing from the group coordinator 702 via peer-to-peer communications link 722 because group member 704 is in the same room (and within a transmission range suitable for peer-to-peer communications link 722) whereas group member 706 is unable to receive clock timing from the group coordinator 702 via a peer-to-peer transmission because group 706 is not in the same room (and thus, not within a transmission range suitable for peer-to-peer communication).

However, in other embodiments that use different transmission protocols, group member 706 may receive clock timing from the group coordinator 702 via both (i) network 710 and (ii) another communications link (not shown). For example, in some embodiments not shown in FIG. 7, the group coordinator 702 may transmit clock timing to group members 704 and 706 via both (i) a first WiFi network (e.g., a 5.0 GHz network) and (ii) a second WiFi network (e.g., a 2.4 GHz network). Other arrangements whereby the group coordinator 702 transmits clock timing via both a first communications link and a second communication to one or both of group members 704 and 706 are possible as well.

As mentioned above, in example 700, group member 704 receives clock timing information from the group coordinator 702 via both (i) network 710 and (ii) peer-to-peer communications link 722.

Group member 704 comprises a first network interface configured to receive, via network 710, (i) a first series of indications relating to a clock time of a clock at the group coordinator 702 (e.g., SNTP or similar timing information messages), (ii) audio information, and (iii) playback timing for the audio information. As described previously, the playback timing comprises a future time relative to the clock time of the clock at the group coordinator 702 at which the group member 704 is to play audio corresponding to at least a portion of the audio information received from the group coordinator 702. Because the future time for playback in the playback timing is based on the clock at the group coordinator 702, the group member 704 is better able to play the audio content in synchrony with other members of the playback group when the group member 704 has a better estimate of the clock at the group coordinator 702.

Group member 704 further comprises a second network interface configured to receive a second series of indications of the clock time of the clock at the group coordinator 702. So, with respect to the clock timing information received from the group coordinator 702, the group member 704 comprises (i) a first interface configured to receive clock timing from the group coordinator 702 (a primary clock timing link) and (ii) a second interface configured to receive clock timing from the group coordinator 702 (a secondary clock timing link). In operation, the clock timing received via each of the first and second interfaces in some embodiments comprises a series of indications of the clock time of the clock at the group coordinator 702.

In some embodiments, the first interface comprises a first wireless communications interface and the second interface comprises a second wireless communications interface. In operation, receiving the first series of indications relating to the clock time of the clock at the group coordinator 702 comprises receiving the first series of indications via data packets over a Wireless Local Area Network (WLAN), and receiving the second series of indications of the clock time of the clock at the group coordinator 702 comprises receiving the second series of indications via data packets over a wireless transmission link separate from the WLAN.

In some embodiments, the first interface comprises a first wireless communications interface and the second interface comprises a microphone. In operation, receiving the first series of indications relating to the clock time of the clock at the group coordinator 702 comprises receiving the first series of indications via data packets over a WLAN, and receiving the second series of indications of the clock time of the clock at the group coordinator 702 comprises receiving the second series of indications via data packets encoded in an acoustic signal. In some embodiments, the acoustic signal is an ultrasonic, or high frequency, acoustic signal that is above the range of human hearing.

In some embodiments, the first interface comprises a first wireless communications interface and the second interface comprises an infrared receiver or another type of optical receiver. In operation, receiving the first series of indications relating to the clock time of the clock at the group coordinator 702 comprises receiving the first series of indications via data packets over a WLAN, and receiving the second series of indications of the clock time of the clock at the group coordinator 702 comprises receiving the second series of indications via data packets encoded in an infrared signal or other type of optical signal.

In operation, group member 704 determines a timing offset between a clock time at the group member 704 and a clock time of the clock at the group coordinator 702 based on (i) the first series of indications of the clock time of the clock at the group coordinator 702 received via the primary timing link and (ii) the second series of indications of the clock time of the clock at the group coordinator 702 received via the secondary timing link.

In some embodiments, determining the timing offset between the clock time at the group member 704 and the clock time of the clock at the group coordinator 702 based on the first series of indications of the clock time of the clock at the group coordinator 702 and the second series of indications of the clock time of the clock at the group coordinator 702 includes determining the actual clock time of the clock at the group coordinator 702 based on (i) a previously estimated clock time of the clock at the group coordinator 702, (ii) a variance associated with the previously estimated clock time of the clock at the group coordinator 702, (iii) a current indication of the clock time of the clock at the group coordinator 702 based on a combination of the first series of indications and the second series of indications, and (iv) a variance associated with the current indication of the clock time of the clock at the group coordinator 702. As explained further herein, the current indication of the clock time of the clock at the group coordinator 702 and its associated variance are based on a fusion (or combination) of the clock timing received via the primary and secondary timing links.

In some embodiments, determining the timing offset between the clock time at the group member 704 and the clock time of the clock at the group coordinator 702 based on the first series of indications of the clock time of the clock at the group coordinator 702 received via the primary link and the second series of indications of the clock time of the clock at the group coordinator 702 received via the secondary link includes determining a timing error between the clock time of the clock at the group member 704 and the clock time of the clock at the group coordinator 702 based on (i) a previously estimated clock time error between the clock times of the clocks at the group member 704 and the group coordinator 702, (ii) a variance associated with the previously estimated clock time error between the clock times of the clocks at the group member 704 and the group coordinator 702, (iii) a current indication of the clock time error between the clock times of the clocks at the group member 704 and the group coordinator 702 based on a combination of the first series of indications and the second series of indications, and (iv) a variance associated with the current indication of the clock time error between the clock times of the clocks at the group member 704 and the group coordinator 702 based on a combination of the first series of indications and the second series of indications. As explained further herein, the current indication of the clock time of the clock at the group coordinator 702 and its associated variance (both of which are used for determining clock time error) are based on a fusion (or combination) of the clock timing received via the primary and secondary timing links.

In operation, group member 704 uses the determined timing offset between the clock at the group member 704 and the clock time of the clock at the group coordinator 702 to play audio content in synchrony with at least group member 706. In embodiments where group coordinator 702 is also a playback device configured to play audio content in synchrony with the playback group, group member 704 uses the determined timing offset between the clock at the group member 704 and the clock time of the clock at the group coordinator 702 to play audio content in synchrony with both group member 706 and group coordinator 702.

In some embodiments, determining the timing offset comprises (i) iteratively estimating the clock time of the clock at the group coordinator 702 based on the first series of indications of the clock time of the clock at the group coordinator 702 and the second series of indications of the clock time of the clock at the group coordinator 702, and (ii) determining the timing offset based on the iteratively estimated clock time of the clock at the group coordinator 702 and the clock at the group member 704.

In some embodiments, iteratively estimating the clock time of the clock at the group coordinator 702 based on the first series of indications of the clock time of the clock at the group coordinator 702 and the second series of indications of the clock time of the clock at the group coordinator 702 comprises recursively estimating the clock time of the clock at the group coordinator 702 based on the first series of indications of the clock time of the clock at the group coordinator 702 and the second series of indications of the clock time of the clock at the group coordinator 702.

In some embodiments, iteratively estimating the clock time of the clock at the group coordinator 702 comprises iteratively estimating the clock time of the clock at the group coordinator 702 based on (i) a previously estimated clock time of the clock at the group coordinator 702, (ii) a variance associated with the previously estimated clock time of the clock at the group coordinator 702, (iii) a current indication of the clock time of the clock at the group coordinator 702 based on a combination of the first series of indications and the second series of indications, and (iv) a variance associated with the current indication of the clock time of the clock at the group coordinator 702.

In some embodiments, iteratively estimating the clock time of the clock at the group coordinator 702 based on (i) the first series of indications of the clock time of the clock at the group coordinator 702 and (ii) the second series of indications of the clock time of the clock at the group coordinator 702 comprises, for time $T_i$: (i) when a first indication for time $T_i$ has been received via the first interface and a second indication for time $T_i$ has been received via the second interface, combining the first indication and the second indication based on a first variance associated with the first indication and a second variance associated with the second indication to generate a combined indication for $T_i$ and a variance associated with the combined indication for $T_i$; and (ii) estimating the clock time of the clock at the group coordinator 702 for time $T_i$ based on (a) the combined indication for $T_i$ and the variance associated with the combined indication for $T_i$ and (b) a previous estimate of the clock time of the clock at the group coordinator 702 for time $T_{i-1}$ and a variance associated with the previous estimate of the clock time of the clock at the group coordinator 702 for time $T_{i-1}$.

In operation, during a period of time, the group member 704 may sometimes receive an indication of the clock time of the clock at the group coordinator 702 via the first interface but not receive an indication of the clock time at the group coordinator 702 via the second interface. Accordingly, in some embodiments, iteratively estimating the clock time of the clock at the group coordinator 702 based on (i) the first series of indications of the clock time of the clock at the group coordinator 702 and (ii) the second series of indications of the clock time of the clock at the group coordinator 702 comprises, for time $T_i$: when a first indication for time $T_i$ has been received via the first interface but a second indication for time $T_i$ has not been received via the second interface, estimating the clock time of the clock at the group coordinator 702 for time $T_i$ based on (i) the first indication for time $T_i$ and the variance associated with first indication for time $T_i$ and (ii) a previous estimate of the clock time of the clock at the group coordinator 702 for time $T_{i-1}$ and a variance associated with the previous estimate of the clock time of the clock at the group coordinator 702 for time $T_{i-1}$.

Similarly, during a period of time, the group member 704 may sometimes receive an indication of the clock time of the clock at the group coordinator 702 via the second interface but not receive an indication of the clock time at the group coordinator 702 via the first interface. Accordingly, in some embodiments, iteratively estimating the clock time of the clock at the group coordinator 702 device based on (i) the first series of indications of the clock time of the clock at the group coordinator 702 and (ii) the second series of indications of the clock time of the clock at the group coordinator 702 comprises, for time $T_i$: when a first indication for time $T_i$ has not been received via the first interface but a second indication for time $T_i$ has been received via the second interface, estimating the clock time of the clock at the computing device for time $T_i$ based on (i) the second indication for time $T_i$ and the variance associated with second indication for time $T_i$ and (ii) a previous estimate of the clock time of the clock at the computing device for time $T_{i-1}$ and a variance associated with the previous estimate of the clock time of the clock at the computing device for time $T_{i-1}$.

In some embodiments, the group member 704 comprises a state estimator configured to iteratively (or recursively in some embodiments) estimate the clock time of the clock at the group coordinator 702. In some embodiments, the state estimator comprises one of a Kalman filter, an extended Kalman filter, or any other state estimator now known or later developed that is suitable for estimating a clock time of the group coordinator 702 based on several indications of the clock time of the clock at the group coordinator 702.

In some example embodiments, the group member 704 comprises a Kalman filter configured to estimate the clock time of the clock at the group coordinator 702. In operation, the group member 704 receives a first indication $Z_1$ of the clock time of the clock at the group coordinator 702 and a second indication $Z_2$ of the clock time of the clock at the group coordinator 702, where the first indication $Z_1$ has a variance $\sigma_1^2$ and the second indication $Z_2$ variance $\sigma_2^2$.

The first indication $Z_1$ and the second indication $Z_2$ are combined to generate a weighted clock time indication, $\hat{C}$, according to Equation 1, where the combined clock time indication, $\hat{C}$, has a variance, $\hat{\sigma}^2$, according to Equation 2:

$$\hat{C} = Z_1 \frac{\sigma_2^2}{\sigma_1^2 + \sigma_2^2} + Z_2 \frac{\sigma_1^2}{\sigma_1^2 + \sigma_2^2}, \qquad \text{Equation 1:}$$

$\hat{C}$=weighted combination of the first indication, $Z_1$, and the second indication, $Z_2$;
$Z_1$=the first indication of the clock time of the clock at the group coordinator 702 received by the group member 704 via the first interface;
$\sigma_1^2$=the variance of $Z_1$;
$Z_2$=the second indication of the clock time of the clock at the group coordinator 702 received by the group member 704 via the second interface; and
$\sigma_2^2$=the variance of $Z_2$.

$$\hat{\sigma}^2 = \frac{\sigma_1^2 \cdot \sigma_2^2}{\sigma_1^2 + \sigma_2^2}, \qquad \text{Equation 2:}$$

$\sigma_1^2$=the variance of $Z_1$; and
$\sigma_2^2$=the variance of $Z_2$.

In some embodiments where the group member 704 comprises a Kalman filter, the Kalman filter is configured to estimate a current clock time and variance ($\hat{x}_i$, $\hat{\sigma}^2_i$) of the clock at the group coordinator 702 at time $T_i$ based on a prior estimate of the clock time and variance ($\hat{x}_{i-1}$, $\hat{\sigma}^2_{i-1}$) of the clock at the group coordinator 702 at time $T_{i-1}$ according to Equations 3, 4, and 5, where Equation 3 returns the current clock time, $\hat{x}_i$, at time $T_i$, Equation 4 returns the variance, $\hat{\sigma}^2_i$, of the estimated clock time, $\hat{x}_i$, at time $T_i$, and Equation 5 is the Kalman gain, $K_i$, of the Kalman filter.

$$\hat{x}_i = \hat{x}_{i-1} + K_i(\hat{C} - \hat{x}_{i-1}), \text{ where} \qquad \text{Equation 3:}$$

$\hat{x}_i$=the estimated clock time of the clock at the group coordinator 702 at time $T_i$;
$\hat{x}_{i-1}$=a prior estimated clock time of the clock at the group coordinator 702 at time $T_{i-1}$;
$K_i$=the Kalman gain of the Kalman filter;
$\hat{C}$=the combination of the first indication, $Z_1$, and the second indication, $Z_2$, which was calculated in Equation 1 above.

$$\hat{\sigma}_i^2 = (1-K_i)\hat{\sigma}_{i-1}^2, \text{ where} \qquad \text{Equation 4:}$$

$\hat{\sigma}_i^2$=the variance of the estimated clock time, $\hat{x}_i$, of the clock at the group coordinator 702 at time $T_i$;
$K_i$=the Kalman gain of the Kalman filter; and
$\hat{\sigma}_{i-1}^2$=a variance of a prior estimated clock time of the clock at the group coordinator 702 at time $T_{i-1}$;

$$K_i = \frac{\sigma_2^2}{\sigma_1^2 + \sigma_2^2}, \qquad \text{Equation 5:}$$

where
$K_i$=the Kalman gain of the Kalman filter;
$\sigma_1^2$=the variance of $Z_1$; and
$\sigma_2^2$=the variance of $Z_2$.

Regardless of which approach the group member 704 uses to determine the clock time of the clock at the group coordinator 702, the group member 704 uses the determined clock time to one or both of (i) calculate a clock time offset between the clock at the group coordinator 702 and the clock at the group member 704 and/or (ii) synchronize the clock at the group member 704 to the clock at the group coordinator 702.

In some embodiments, the group member 704 can synchronize its clock to the clock at the group coordinator 702, but not play audio in synchrony with the group coordinator 702. This may occur in examples where the group coordinator provides clock timing for a playback group but does not itself play audio content in synchrony with the playback devices in the playback group.

In some embodiments, the group member 704 can use the clock time offset to play audio in synchrony with one or more other group members without necessarily synchronizing its clock to the clock at the group coordinator 702. This is the case when individual playback devices in a playback group are configured to determine timing offsets based on clock timing information and update playback timing according to the methods disclosed and described previously. However, in some embodiments where the group member 704 synchronizes its clock to the clock at the group coordinator 702, the group member 704 need not necessarily use a timing offset to update playback timing because, when the group member's 704 clock is synchronized with the group coordinator's clock 702, the timing offset between the two clocks should be zero.

Finally, FIG. 7 describes features and functionality performed by group member 704 for illustration purposes. Persons of skill in the art will understand that any group member(s) in a synchrony group or other playback group able to receive clock timing via two different communications links in the manner described herein can implement the features and functions described with reference to group member 704 in FIG. 7.

VII. Example Methods

Figure 8:
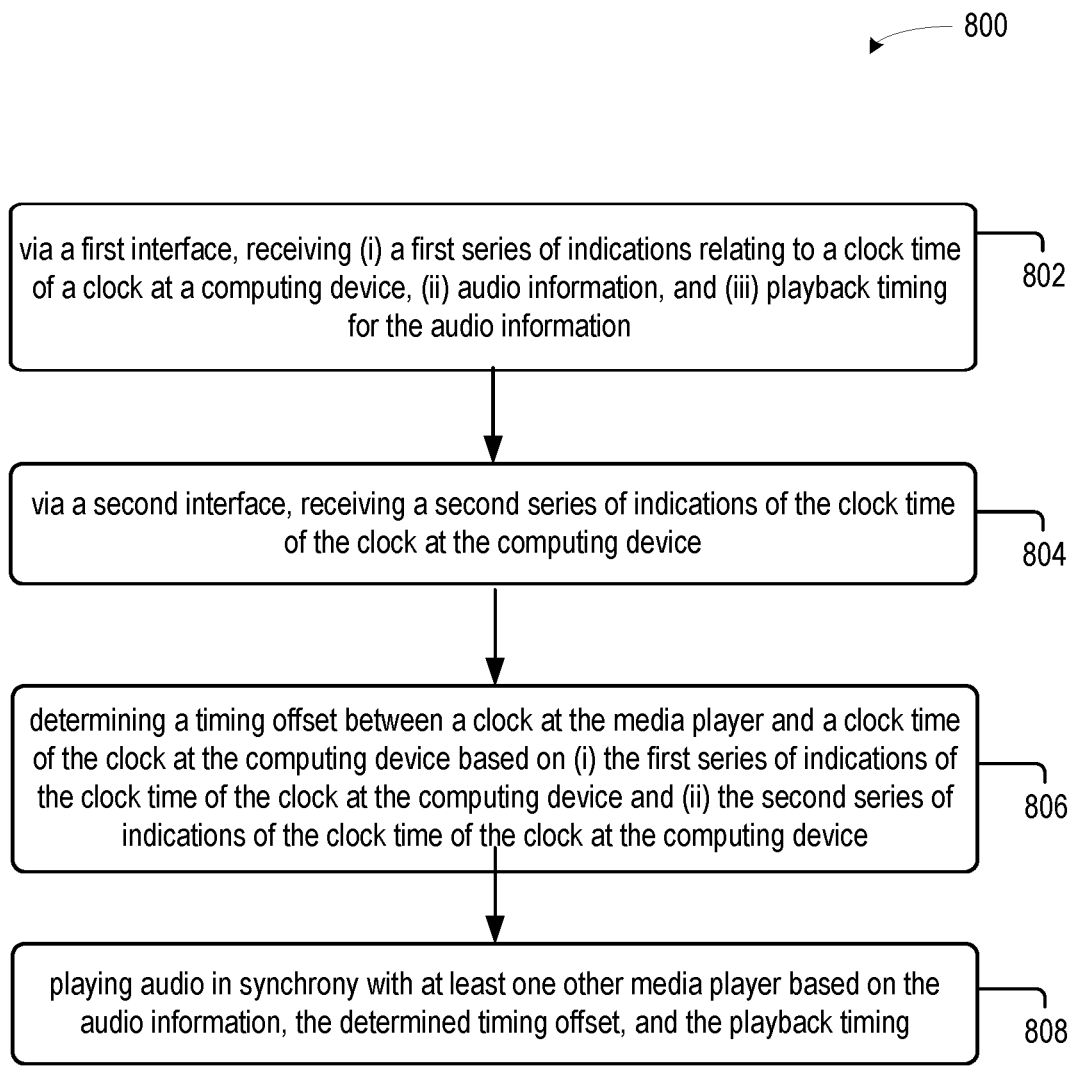
FIG. 8 shows an example method performed by a playback device for clock synchronization and/or synchronous playback based on out-of-band synchronization signaling according to some embodiments.

FIG. 8 shows an example method performed by a playback device for clock synchronization and/or synchronous playback based on out-of-band synchronization signaling according to some embodiments.

In operation, method 800 may be performed by group member in playback group, such as (but not limited to) group member 704 shown and described with reference to FIG. 7.

Method 800 begins at block 802, which includes a media player, via a first interface, receiving (i) a first series of indications relating to a clock time of a clock at a computing device, (ii) audio information, and (iii) playback timing for the audio information, wherein the playback timing comprises a future time relative to the clock time of the clock at the computing device at which the media player is to play audio corresponding to at least a portion of the audio information.

In some embodiments, the media player is the same as or similar to group member 704 in FIG. 7, and the computing device is the same as or similar to group coordinator 702 in FIG. 7. Just like the group coordinator 702 need not necessarily be configured to play audio in synchrony with group member 704, the computing device need not necessarily be configured to play audio content with the media player. But in embodiments where the computing device is a playback device configured in the playback group with the group member 704, the computing device is also configured to play audio content in synchrony with the media player.

Next, method 800 advances to block 804, which includes the media player, via a second interface, receiving a second series of indications of the clock time of the clock at the computing device.

In operation, the first interface and the second interface may comprise any combination of the first and second interfaces disclosed and described herein.

For example, in some embodiments, the first (or primary) interface comprises a first wireless communications interface and the second (or secondary) interface comprises a second wireless communications interface. In such embodiments, receiving the first series of indications relating to the clock time of the clock at the computing device comprises receiving the first series of indications via data packets over a wireless Local Area Network (LAN), and receiving the second series of indications of the clock time of the clock at the computing device comprises receiving the second series of indications via data packets over a wireless transmission link separate from the LAN.

In some embodiments, the first (or primary) interface comprises a first wireless communications interface and the second (or secondary) interface comprises a microphone. In such embodiments, receiving the first series of indications relating to the clock time of the clock at the computing device comprises receiving the first series of indications via data packets over a wireless Local Area Network (LAN), and receiving the second series of indications of the clock time of the clock at the computing device comprises receiving the second series of indications via data packets encoded in an audio signal.

In some embodiments, the first (or primary) interface comprises a first wireless communications interface and the second (or secondary) interface comprises an infrared receiver or other type of optical receiver. In such embodiments, receiving the first series of indications relating to the clock time of the clock at the computing device comprises receiving the first series of indications via data packets over a wireless Local Area Network (LAN), and receiving the second series of indications of the clock time of the clock at the computing device comprises receiving the second series of indications via data packets encoded in an infrared signal or other type of optical signal.

Next, method 800 advances to block 806, which includes the media player determining a timing offset between a clock at the media player and a clock time of the clock at the computing device based at least in part on (i) the first series of indications of the clock time of the clock at the computing device received via the primary link and (ii) the second series of indications of the clock time of the clock at the computing device received via the secondary link.

In some embodiments, the block 806 step of determining the timing offset includes: (i) iteratively estimating the clock time of the clock at the computing device based on (a) the first series of indications of the clock time of the clock at the computing device received via the primary link and (b) the second series of indications of the clock time of the clock at the computing device received via the secondary link; and (ii) determining the timing offset based on the iteratively estimated clock time of the clock at the computing device and the clock at the media player.

In some embodiments, the block 806 step of iteratively estimating the clock time of the clock at the computing device comprises using a state estimator to iteratively (or perhaps recursively) estimate the clock time of the clock at the computing device based on (i) a previously estimated clock time of the clock at the computing device, (ii) a variance associated with the previously estimated clock time of the clock at the computing device, (iii) a current indication of the clock time of the clock at the computing device based on a combination of the first series of indications and the second series of indications, and (iv) a variance associated with the current indication of the clock time of the clock at the computing device. In some embodiments, the state estimator comprises one of a Kalman filter, an extended Kalman filter, or any other type of state estimator now known or later developed that is suitable for estimating time values based on a several time measurements.

In some embodiments, the block 806 step of iteratively estimating the clock time of the clock at the computing device based on (i) the first series of indications of the clock time of the clock at the computing device and (ii) the second series of indications of the clock time of the clock at the computing device comprises, for time $T_i$: (i) when a first indication for time $T_i$ has been received via the first interface and a second indication for time $T_i$ has been received via the second interface, combining (or fusing) the first indication and the second indication based on a first variance associated with the first indication and a second variance associated with the second indication to generate a combined indication for $T_i$ and a variance associated with the combined indication for $T_i$; and (ii) estimating the clock time of the clock at the computing device for time $T_i$ based on (a) the combined indication for $T_i$ and the variance associated with the combined indication for $T_i$ and (b) a previous estimate of the clock time of the clock at the computing device for time $T_{i-1}$ and a variance associated with the previous estimate of the clock time of the clock at the computing device for time $T_{i-1}$.

In instances where a first indication for time $T_i$ has been received via the first interface but a second indication for time $T_i$ has not been received via the second interface, the block 806 step of iteratively estimating the clock time of the clock at the computing device based on (i) the first series of indications of the clock time of the clock at the computing device and (ii) the second series of indications of the clock time of the clock at the computing device comprises, for time $T_i$, estimating the clock time of the clock at the computing device for time $T_i$ based on (a) the first indication for time $T_i$ and the variance associated with first indication for time $T_i$ and (b) a previous estimate of the clock time of the clock at the computing device for time $T_{i-1}$ and a variance associated with the previous estimate of the clock time of the clock at the computing device for time $T_{i-1}$.

In instances where a first indication for time $T_i$ has not been received via the first interface but a second indication for time $T_i$ has been received via the second interface, the block 806 step of iteratively estimating the clock time of the clock at the computing device based on (i) the first series of indications of the clock time of the clock at the computing device and (ii) the second series of indications of the clock time of the clock at the computing device comprises, for time $T_i$, estimating the clock time of the clock at the computing device for time $T_i$ based on (i) the second indication for time $T_i$ and the variance associated with second indication for time $T_i$ and (ii) a previous estimate of the clock time of the clock at the computing device for time $T_{i-1}$ and a variance associated with the previous estimate of the clock time of the clock at the computing device for time $T_{i-1}$.

Next, method 800 advances to block 808, which includes the media player playing audio in synchrony with at least one other media player based on the audio information, the determined timing offset, and the playback timing.

In some embodiments of method 800, the media player comprises a first media player (e.g., group member 704 in FIG. 7) and the at least one other media player comprises the computing device (e.g., group coordinator 702 in FIG. 7). In such embodiments, playing audio in synchrony with at least one other media player based on the audio information, the timing offset, and the playback timing comprises the group member 704 playing audio in synchrony with at least the group coordinator 702 based on the audio information, the timing offset, and the playback timing according to the synchronous playback methods and procedures disclosed and described herein.

Similarly, in some embodiments of method 800, the first media player comprises a first group member (e.g., group member 704) and the at least one other media player comprises a second group member (e.g., group member 706 in FIG. 7). In such embodiments, playing audio in synchrony with at least one other media player based on the audio information, the timing offset, and the playback timing comprises the group member 704 playing audio in synchrony with at least the group member 706 based on the audio information, the timing offset, and the playback timing according to the synchronous playback methods and procedures disclosed and described herein.

Additionally, in some embodiments of method 800, the first media player comprises a first group member (e.g., group member 704) and at least one other media player comprises the computing device (e.g., group coordinator 702) and a second group member (e.g., group member 706). In such embodiments, playing audio in synchrony with at least one other media player based on the audio information, the timing offset, and the playback timing comprises the group member 704) playing audio in synchrony with at least the group coordinator 702 and group member 706 based on the audio information, the timing offset, and the playback timing according to the synchronous playback methods and procedures disclosed and described herein.

VIII. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A playback device comprising:
   one or more processors;
   a first interface configured to facilitate communication via at least one wireless access point;
   a second interface configured to facilitate communication over at least one peer-to-peer communications link; and
   at least one non-transitory computer-readable medium comprising program instructions that are executable by the one or more processors such that the playback device is configured to:
   via a wireless access point, receive (i) a first series of indications relating to a clock time of a clock at a computing device, (ii) audio information, and (iii) playback timing for the audio information, wherein the playback timing comprises a future time relative to the clock time of the clock at the computing device at which the playback device is to play audio corresponding to at least a portion of the audio information;
   via a peer-to-peer communications link, receive a second series of indications of the clock time of the clock at the computing device;
   determine a timing offset between a clock at the playback device and a clock time of the clock at the computing device based on (i) the first series of indications of the clock time of the clock at the computing device and (ii) the second series of indications of the clock time of the clock at the computing device; and
   play audio in synchrony with at least one other playback device based on the audio information, the determined timing offset, and the playback timing.

2. The playback device of claim 1, wherein to determine the timing offset, the playback device is configured to:
   iteratively estimate the clock time of the clock at the computing device based on (i) the first series of indications of the clock time of the clock at the computing device and (ii) the second series of indications of the clock time of the clock at the computing device; and
   determine the timing offset based on the iteratively estimated clock time of the clock at the computing device and the clock at the playback device.

3. The playback device of claim 2, wherein to iteratively estimate the clock time of the clock at the computing device, the playback device is configured to:
   iteratively estimate, using a state estimator, the clock time of the clock at the computing device based on (i) a previously estimated clock time of the clock at the computing device, (ii) a variance associated with the previously estimated clock time of the clock at the computing device, (iii) a current indication of the clock time of the clock at the computing device based on a combination of the first series of indications and the second series of indications, and (iv) a variance associated with the current indication of the clock time of the clock at the computing device.

4. The playback device of claim 2, wherein to iteratively estimate the clock time of the clock at the computing device based on (i) the first series of indications of the clock time of the clock at the computing device and (ii) the second series of indications of the clock time of the clock at the computing device comprises, for time $T_i$, the playback device is configured to:
   when a first indication for time $T_i$ has been received via the wireless access point and a second indication for time $T_i$ has been received via the peer-to-peer communications link, combine the first indication and the second indication based on a first variance associated with the first indication and a second variance associated with the second indication to generate a combined indication for $T_i$ and a variance associated with the combined indication for $T_i$; and
estimate the clock time of the clock at the computing device for time $T_i$ based on (i) the combined indication for $T_i$ and the variance associated with the combined indication for $T_i$ and (ii) a previous estimate of the clock time of the clock at the computing device for time $T_{i-1}$ and a variance associated with the previous estimate of the clock time of the clock at the computing device for time $T_{i-1}$.

5. The playback device of claim 2, wherein to iteratively estimate the clock time of the clock at the computing device based on (i) the first series of indications of the clock time of the clock at the computing device and (ii) the second series of indications of the clock time of the clock at the computing device comprises, for time $T_i$, the playback device is configured to:
when a first indication for time $T_i$ has been received via the wireless access point but a second indication for time $T_i$ has not been received via the peer-to-peer communications link, estimate the clock time of the clock at the computing device for time $T_i$ based on (i) the first indication for time $T_i$ and a variance associated with first indication for time $T_i$ and (ii) a previous estimate of the clock time of the clock at the computing device for time $T_{i-1}$ and a variance associated with the previous estimate of the clock time of the clock at the computing device for time $T_{i-1}$.

6. The playback device of claim 2, wherein to iteratively estimate the clock time of the clock at the computing device based on (i) the first series of indications of the clock time of the clock at the computing device and (ii) the second series of indications of the clock time of the clock at the computing device comprises, for time $T_i$, the playback device is configured to:
when a first indication for time $T_i$ has not been received via the wireless access point but a second indication for time $T_i$ has been received via the peer-to-peer communications link, estimate the clock time of the clock at the computing device for time $T_i$ based on (i) the second indication for time $T_i$ and a variance associated with second indication for time $T_i$ and (ii) a previous estimate of the clock time of the clock at the computing device for time $T_{i-1}$ and a variance associated with the previous estimate of the clock time of the clock at the computing device for time $T_{i-1}$.

7. The playback device of claim 1, wherein to receive the first series of indications relating to the clock time of the clock at the computing device, the playback device is configured to receive the first series of indications via data packets over a wireless Local Area Network (LAN), and wherein to receive the second series of indications of the clock time of the clock at the computing device, the playback device is configured to receive the second series of indications via data packets over a wireless transmission link separate from the LAN.

8. The playback device of claim 1, wherein the peer-to-peer communications link is implemented via a microphone, wherein to receive the first series of indications relating to the clock time of the clock at the computing device, the playback device is configured to receive the first series of indications via data packets over a wireless Local Area Network (LAN), and wherein to receive the second series of indications of the clock time of the clock at the computing device, the playback device is configured to receive the second series of indications via data packets encoded in an audio signal.

9. The playback device of claim 1, wherein the peer-to-peer communications link is implemented via an infrared receiver, wherein to receive the first series of indications relating to the clock time of the clock at the computing device, the playback device is configured to receive the first series of indications via data packets over a wireless Local Area Network (LAN), and wherein to receive the second series of indications of the clock time of the clock at the computing device, the playback device is configured to receive the second series of indications via data packets encoded in an infrared signal.

10. The playback device of claim 1, wherein the playback device comprises a first playback device and wherein the computing device comprises a second playback device, and wherein to play audio in synchrony with at least one other playback device based on the audio information, the timing offset, and the playback timing, the first playback device is configured to play audio in synchrony with at least the second playback device based on the audio information, the timing offset, and the playback timing.

11. Tangible, non-transitory, computer readable memory comprising instructions encoded therein, wherein the instructions, when executed by one or more processors, cause a playback device to perform functions comprising:
via a wireless access point at the playback device, receiving (i) a first series of indications relating to a clock time of a clock at a computing device, (ii) audio information, and (iii) playback timing for the audio information, wherein the playback timing comprises a future time relative to the clock time of the clock at the computing device at which the playback device is to play audio corresponding to at least a portion of the audio information;
via a peer-to-peer communications link at the playback device, receiving a second series of indications of the clock time of the clock at the computing device;
determining a timing offset between a clock at the playback device and a clock time of the clock at the computing device based on (i) the first series of indications of the clock time of the clock at the computing device and (ii) the second series of indications of the clock time of the clock at the computing device; and
playing audio in synchrony with at least one other playback device based on the audio information, the determined timing offset, and the playback timing.

12. The tangible, non-transitory computer-readable media of claim 11, wherein determining the timing offset comprises:
iteratively estimating the clock time of the clock at the computing device based on (i) the first series of indications of the clock time of the clock at the computing device and (ii) the second series of indications of the clock time of the clock at the computing device; and
determining the timing offset based on the iteratively estimated clock time of the clock at the computing device and the clock at the playback device.

13. The tangible, non-transitory computer-readable media of claim 12, wherein iteratively estimating the clock time of the clock at the computing device comprises:
iteratively estimating, using a state estimator, the clock time of the clock at the computing device based on (i) a previously estimated clock time of the clock at the computing device, (ii) a variance associated with the previously estimated clock time of the clock at the computing device, (iii) a current indication of the clock time of the clock at the computing device based on a combination of the first series of indications and the second series of indications, and (iv) a variance associated with the current indication of the clock time of the clock at the computing device.

14. The tangible, non-transitory computer-readable media of claim 12, wherein iteratively estimating the clock time of the clock at the computing device based on (i) the first series of indications of the clock time of the clock at the computing device and (ii) the second series of indications of the clock time of the clock at the computing device comprises, for time $T_i$:

when a first indication for time $T_i$ has been received via the wireless access point and a second indication for time $T_i$ has been received via the peer-to-peer communications link, combining the first indication and the second indication based on a first variance associated with the first indication and a second variance associated with the second indication to generate a combined indication for $T_i$ and a variance associated with the combined indication for $T_i$, and estimating the clock time of the clock at the computing device for time $T_i$ based on (i) the combined indication for $T_i$ and the variance associated with the combined indication for $T_i$ and (ii) a previous estimate of the clock time of the clock at the computing device for time $T_{i-1}$ and a variance associated with the previous estimate of the clock time of the clock at the computing device for time $T_{i-1}$;

when a first indication for time $T_i$ has been received via the wireless access point but a second indication for time $T_i$ has not been received via the peer-to-peer communications link, estimating the clock time of the clock at the computing device for time $T_i$ based on (i) the first indication for time $T_i$ and the variance associated with first indication for time $T_i$ and (ii) a previous estimate of the clock time of the clock at the computing device for time $T_{i-1}$ and a variance associated with the previous estimate of the clock time of the clock at the computing device for time $T_{i-1}$; and when a first indication for time $T_i$ has not been received via the wireless access point but a second indication for time $T_i$ has been received via the peer-to-peer communications link, estimating the clock time of the clock at the computing device for time $T_i$ based on (i) the second indication for time $T_i$ and the variance associated with second indication for time $T_i$ and (ii) a previous estimate of the clock time of the clock at the computing device for time $T_{i-1}$ and a variance associated with the previous estimate of the clock time of the clock at the computing device for time $T_{i-1}$.

15. The tangible, non-transitory computer-readable media of claim 11, wherein the wireless access point comprises a first wireless Local Area Network (LAN) access point configured to communicate over a first wireless LAN, and wherein the peer-to-peer communications link is configured to one of: (i) communicate via a second wireless LAN separate from the first wireless LAN, (ii) receive data packets encoded in an audio signal, (iii) receive data packets encoded in an infrared signal.

16. A method performed by a playback device, the method comprising:

via a wireless access point, receiving (i) a first series of indications relating to a clock time of a clock at a computing device, (ii) audio information, and (iii) playback timing for the audio information, wherein the playback timing comprises a future time relative to the clock time of the clock at the computing device at which the playback device is to play audio corresponding to at least a portion of the audio information;

via a peer-to-peer communications link, receiving a second series of indications of the clock time of the clock at the computing device;

determining a timing offset between a clock at the playback device and a clock time of the clock at the computing device based on (i) the first series of indications of the clock time of the clock at the computing device and (ii) the second series of indications of the clock time of the clock at the computing device; and playing audio in synchrony with at least one other playback device based on the audio information, the determined timing offset, and the playback timing.

17. The method of claim 16, further comprising:

iteratively estimating the clock time of the clock at the computing device based on (i) the first series of indications of the clock time of the clock at the computing device and (ii) the second series of indications of the clock time of the clock at the computing device; and determining the timing offset based on the iteratively estimated clock time of the clock at the computing device and the clock at the playback device.

18. The method of claim 17, further comprising:

iteratively estimating, using a state estimator, the clock time of the clock at the computing device based on (i) a previously estimated clock time of the clock at the computing device, (ii) a variance associated with the previously estimated clock time of the clock at the computing device, (iii) a current indication of the clock time of the clock at the computing device based on a combination of the first series of indications and the second series of indications, and (iv) a variance associated with the current indication of the clock time of the clock at the computing device.

19. The method of claim 17, wherein iteratively estimating the clock time of the clock at the computing device based on (i) the first series of indications of the clock time of the clock at the computing device and (ii) the second series of indications of the clock time of the clock at the computing device comprises, for time $T_i$:

when a first indication for time $T_i$ has been received via the wireless access point and a second indication for time $T_i$ has been received via the peer-to-peer communications link, combining the first indication and the second indication based on a first variance associated with the first indication and a second variance associated with the second indication to generate a combined indication for $T_i$ and a variance associated with the combined indication for $T_i$, and estimating the clock time of the clock at the computing device for time $T_i$ based on (i) the combined indication for $T_i$ and the variance associated with the combined indication for $T_i$ and (ii) a previous estimate of the clock time of the clock at the computing device for time $T_{i-1}$ and a variance associated with the previous estimate of the clock time of the clock at the computing device for time $T_{i-1}$;

when a first indication for time $T_i$ has been received via the wireless access point but a second indication for time $T_i$ has not been received via the peer-to-peer communications link, estimating the clock time of the clock at the computing device for time $T_i$ based on (i) the first indication for time $T_i$ and the variance associated with first indication for time $T_i$ and (ii) a previous estimate of the clock time of the clock at the computing device for time $T_{i-1}$ and a variance associated with the previous estimate of the clock time of the clock at the computing device for time $T_{i-1}$; and when a first indication for time $T_i$ has not been received via the wireless access point but a second indication for time $T_i$ has been received via the peer-to-peer communications link, estimating the clock time of the clock at the computing device for time $T_i$ based on (i) the second indication for time $T_i$ and the variance associated with second indication for time $T_i$ and (ii) a previous estimate of the clock time of the clock at the computing device for time $T_{i-1}$ and a variance associated with the previous estimate of the clock time of the clock at the computing device for time $T_{i-1}$.

20. The method of claim 16, wherein receiving the first series of indications relating to the clock time of the clock at the computing device comprises receiving the first series of indications via data packets over a wireless Local Area Network (LAN), and wherein receiving the second series of indications of the clock time of the clock at the computing device comprises one of (i) receiving the second series of indications via data packets encoded in one or more radio frequency signals separate from the wireless LAN, (ii) receiving the second series of indications via data packets encoded in one or more audio signals, (iii) receiving the second series of indications via data packets encoded in one of more infrared signals.

* * * * *